(12) United States Patent
Tsangarides et al.

(10) Patent No.: US 11,429,240 B2
(45) Date of Patent: Aug. 30, 2022

(54) TOUCH PANEL

(71) Applicant: Cambridge Touch Technologies Ltd., Cambridge (GB)

(72) Inventors: Constantinos Tsangarides, Cambridge (GB); Paridhi Sharma, Cambridge (GB); Michael Astley, Cambridge (GB); Arokia Nathan, Cambridge (GB); Xiang Cheng, Cambridge (GB); Jiahao Li, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 17/425,303

(22) PCT Filed: Jan. 23, 2020

(86) PCT No.: PCT/GB2020/050151
§ 371 (c)(1),
(2) Date: Jul. 22, 2021

(87) PCT Pub. No.: WO2020/152464
PCT Pub. Date: Jul. 30, 2020

(65) Prior Publication Data
US 2022/0147187 A1    May 12, 2022

(30) Foreign Application Priority Data

Jan. 25, 2019 (GB) .................... 1901073

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04144* (2019.05);
(Continued)

(58) Field of Classification Search
CPC ............... G06F 3/0412; G06F 3/04144; G06F 2203/04103; G06F 2203/04105; G06F 3/044–0446
See application file for complete search history.

(56) References Cited

U.S. PATENT DOCUMENTS 5,543,588 A    8/1996  Bisset et al.
8,633,916 B2   1/2014  Bernstein et al.
(Continued)

FOREIGN PATENT DOCUMENTS

EP    0574213 A1    12/1993
EP    2899615 A1    7/2015
(Continued)

OTHER PUBLICATIONS

Final Office Action, U.S. Appl. No. 16/385,213 Nathan et al., USPTO, dated Jan. 7, 2020, 23 pages.
(Continued)

*Primary Examiner* — Temesghen Ghebretinsae
*Assistant Examiner* — Ivelisse Martinez Quiles

(57) ABSTRACT

A touch sensor (1) for combined capacitive touch and force sensing is described. The touch sensor (1) includes number plurality of first electrodes (4) and a number of second electrodes (5). The second electrodes (5) are insulated from the first electrodes (4). The first and second electrodes (4, 5) form a grid for capacitive touch sensing. The touch sensor (1) also includes a transparent cover (6). The touch sensor (1) also includes a transparent piezoelectric film (3) arranged between the transparent cover (6) and the first and second electrodes (4, 5). The touch sensor (1) also includes a patterned counter electrode (8) disposed between the transparent piezoelectric film (3) and the transparent cover (6). The patterned counter electrode (8) is a conductive grid formed from the union of plurality of counter electrode line elements (9). A pitch of the counter electrode line elements (Continued)

(9) is larger than a pitch of the first electrodes (4) and/or second electrodes (5).

20 Claims, 22 Drawing Sheets

(52) U.S. Cl.
CPC .............. *G06F 2203/04103* (2013.01); *G06F 2203/04105* (2013.01)

(56) References Cited

U.S. PATENT DOCUMENTS

| | | |
|---|---|---|
| 10,254,894 B2 | 4/2019 | Nathan et al. |
| 10,282,046 B2 | 5/2019 | Nathan et al. |
| 10,310,659 B2 | 6/2019 | Nathan et al. |
| 10,318,038 B2 | 6/2019 | Nathan et al. |
| 10,430,009 B2 | 10/2019 | Nathan et al. |
| 10,739,926 B2 | 8/2020 | Nathan et al. |
| 11,237,667 B2 | 2/2022 | Nathan et al. |
| 2010/0013785 A1 | 1/2010 | Murai et al. |
| 2012/0120017 A1 | 5/2012 | Worfolk et al. |
| 2012/0268416 A1 | 10/2012 | Pirogov |
| 2013/0076646 A1 | 3/2013 | Krah |
| 2013/0127776 A1 | 5/2013 | Guard et al. |
| 2013/0265256 A1 | 10/2013 | Nathan et al. |
| 2013/0278544 A1 | 10/2013 | Cok |
| 2014/0008203 A1 | 1/2014 | Nathan et al. |
| 2014/0062934 A1 | 3/2014 | Coulsen et al. |
| 2014/0139444 A1 | 5/2014 | Kauhanen |
| 2014/0341446 A1 | 11/2014 | Hare et al. |
| 2014/0354585 A1 | 12/2014 | Cok et al. |
| 2015/0153900 A1 | 6/2015 | Chang et al. |
| 2015/0185955 A1 | 7/2015 | Ando |
| 2015/0193055 A1 | 7/2015 | Ando et al. |
| 2015/0331517 A1 | 11/2015 | Filiz et al. |
| 2016/0011666 A1 | 1/2016 | Evreinov et al. |
| 2016/0034089 A1 | 2/2016 | Kano et al. |
| 2016/0062505 A1 | 3/2016 | Hwang et al. |
| 2016/0306481 A1 | 10/2016 | Filiz et al. |
| 2017/0199624 A1* | 7/2017 | Nathan ................. G06F 3/0445 |
| 2017/0228072 A1 | 8/2017 | Amin et al. |
| 2017/0262099 A1 | 9/2017 | Nathan et al. |
| 2017/0364193 A9 | 12/2017 | Nathan et al. |
| 2017/0371470 A1 | 12/2017 | Nathan et al. |
| 2018/0183438 A1* | 6/2018 | Shigetaka ............ H03K 17/962 |
| 2019/0050080 A1 | 2/2019 | Bagheri et al. |
| 2019/0212846 A1 | 7/2019 | Nathan et al. |
| 2019/0243502 A1 | 8/2019 | Nathan et al. |
| 2019/0243503 A1 | 8/2019 | Nathan et al. |
| 2019/0253053 A1 | 8/2019 | Nathan et al. |
| 2019/0361547 A1 | 11/2019 | Nathan et al. |
| 2020/0159381 A1 | 5/2020 | Ban et al. |
| 2020/0218384 A1* | 7/2020 | Guo ...................... G06F 3/0412 |
| 2020/0293132 A1 | 9/2020 | Nathan et al. |

FOREIGN PATENT DOCUMENTS

| | | |
|---|---|---|
| EP | 3457263 A1 | 3/2019 |
| JP | H8-44493 A | 2/1996 |
| JP | 2013-513865 | 4/2013 |
| JP | 2013-131110 A | 7/2013 |
| JP | 2014-209297 A | 11/2014 |
| JP | 2014-238267 A | 12/2014 |
| WO | 2014/045847 A1 | 3/2014 |
| WO | 2014042170 A1 | 3/2014 |
| WO | 2014045847 A1 | 3/2014 |
| WO | 2014098946 A1 | 6/2014 |
| WO | 2014/196367 | 12/2014 |
| WO | 2014192710 A1 | 12/2014 |
| WO | 2016102975 A2 | 6/2016 |
| WO | 2017109455 A1 | 6/2017 |

OTHER PUBLICATIONS

Final Office Action, U.S. Appl. No. 16/385,213 Nathan ett. al., USPTO, dated Oct. 19, 2020, 23 pages.
Non final Office Action, U.S. Appl. No. 16/385,213 Nathan ett. al., USPTO, dated Jun. 1, 2020, 22 pages.
Non-final Office Action, U.S. Appl. No. 16/385,213 Nathan et al., USPTO, dated Jun. 14, 2019 20 pages.
Noticie of allowance, U.S. Appl. No. 16/385,213 Nathan et.al., USPTO, dated May 7, 2021, 5 pages.
Combined Search and Examination Report under Sections 17 and 18(3) for UK application No. GB1901073 5 dated Jun. 21, 2019, 6 pages.
International Search Report and Written Opinion, dated Jul. 28, 2020 directed to International application No. PCT/GB2020/050151, 21 pages.

* cited by examiner

TOUCH PANEL

RELATED APPLICATIONS

This application is a 35 U.S.C. § 371 application of PCT/GB2020/050151, filed Jan. 23, 2020, which claims priority to United Kingdom Application No. 1901073.5, filed Jan. 25, 2019, each of which is hereby incorporated by reference as if fully disclosed herein.

FIELD

The present invention relates to a touch panel for combined capacitive and force sensing.

BACKGROUND

Touch screen panels having force-sensing capabilities can enhance user experience through three-dimensional multi-touch interaction.

In a touch panel, drive and sensing electrodes are used for projective capacitive touch detection. To add force-detection capabilities, a piezoelectric layer, an electrode (which may be the drive or sensing electrode) and a counter electrode, which is held at a fixed voltage or ground, are employed. Additional dielectric layers such as PET thin film, adhesives and cover glass may be included to integrate the layers and provide mechanical robustness. Together, the configuration of the layers in the sensor stack define a sensor architecture.

Examples of touch sensors combining capacitive sensing with piezoelectric based force-detection capabilities are described in WO 2016/102975 A1. This document also describes examples of embedded touch panels (in which electrodes are interspersed with display elements such as polarisers etc), in which a patterned electrode is positioned between a user input surface and the drive and sensing electrodes. Further examples of touch sensors combining capacitive sensing with piezoelectric based force-detection capabilities are described in WO 2017/109455 A1.

SUMMARY

According to a first aspect of the invention, there is provided a touch sensor for combined capacitive touch and force sensing, the touch sensor including a plurality of first electrodes and a plurality of second electrodes. The second electrodes are insulated from the first electrodes. The first and second electrodes form a grid for capacitive touch sensing. The touch sensor also includes a transparent cover. The touch sensor also includes a transparent piezoelectric film arranged between the transparent cover and the first and second electrodes. The touch sensor also includes a patterned counter electrode disposed between the transparent piezoelectric film and the transparent cover. The patterned counter electrode is a conductive grid formed from the union of plurality of counter electrode line elements. A pitch of the counter electrode line elements is larger than a pitch of the first electrodes and/or second electrodes.

The counter electrode may include first counter electrode line elements extending in a first direction and second counter electrode line elements extending in a second direction.

The pitch of the counter electrode line elements may be at least double the pitch of the first electrodes and/or second electrodes. The counter electrode line elements may be correlated with the first electrodes and/or second electrodes. The counter electrode line elements may be uncorrelated with the first electrodes and/or second electrodes.

According to a second aspect of the present invention there is provided a touch sensor for combined capacitive touch and force sensing. The touch sensor includes a number of first electrodes and a number of second electrodes. The second electrodes are insulated from the first electrodes. The first and second electrodes are configured for mutual capacitive touch sensing. The touch sensor also includes a transparent cover.

The touch sensor also includes a transparent piezoelectric film stacked between the transparent cover and the first and second electrodes. The touch sensor also includes a patterned counter electrode stacked between the transparent piezoelectric film and the transparent cover. The patterned counter electrode is an interconnected conductive region formed from the union of a plurality of counter electrode elements. The lateral displacements of counter electrode elements with respect to the first and second electrodes are configured to maximise a capacitance between the patterned counter electrode and the first electrodes, or between the patterned counter electrode and the second electrodes.

The first and second electrodes may be disposed in a substantially co-planar configuration. The first electrodes may be disposed in a first plane and the second electrodes may be disposed in a second plane parallel to the first plane. Lateral displacements mean displacements parallel to the plane or planes defined by the first and second electrodes. The first electrodes may be sensing (or receiving) electrodes for a capacitive touch sensing measurement and the second electrodes may be driving (or transmitting) electrodes. The second electrodes may be sensing (or receiving) electrodes for a capacitive touch sensing measurement and the first electrodes may be driving (or transmitting) electrodes.

The patterned counter electrode may include a counter electrode element corresponding to each first electrode.

The patterned counter electrode may include a counter electrode element corresponding to every $N^{th}$ first electrode, wherein N is an integer greater than or equal to two.

The patterned counter electrode may include a counter electrode element corresponding to each second electrode.

The patterned counter electrode may include a counter electrode element corresponding to every $M^{th}$ second electrode, wherein M is an integer greater than or equal to two.

The patterned counter electrode may be formed on a first surface of the transparent cover. The first surface may face the transparent piezoelectric film. The first surface may be in direct contact with the transparent piezoelectric film.

The counter electrode may include a grid formed from the union of a number of first counter electrode line elements extending in a first direction and a number of second counter electrode line elements extending in a second direction.

A characteristic dimension of each of the counter electrode elements may be configured such that the capacitance between the patterned counter electrode and the first electrodes is maximised subject to maintaining a mutual capacitance between each pair of first and second electrodes above an operating threshold. Maintaining a mutual capacitance between each pair of first and second electrodes above an operating threshold may include ensuring that an electric field generated between the first and second electrodes projects sufficiently above the sensor to enable coupling to a sensed object, for example a user's digit or conductive stylus.

The characteristic dimension may be a width of a counter electrode line element.

A display assembly may include the touch sensor, and a display comprising a pixel array. Each of the counter electrode elements may be positioned to overlie a gap between pixels forming the pixel array.

According to a third aspect of the invention there is provided a method of making a display assembly, including receiving a display panel comprising a pixel array, a plurality of first electrodes, and a plurality of second electrodes, the second electrodes insulated from the first electrodes, wherein the first and second electrodes are configured for capacitive touch sensing. The method also includes receiving a pressure sensing assembly comprising a transparent cover having a first face supporting a patterned counter electrode in the form of a conductive grid formed from the union of plurality of counter electrode line elements, and a transparent piezoelectric film bonded to the first face. The method also includes bonding the pressure sensing assembly to the display panel such that the piezoelectric film is stacked between the transparent cover and the first and second electrodes. A pitch of the counter electrode line elements is larger than a pitch of the first electrodes and/or second electrodes.

According to a fourth aspect of the invention there is provided a method of making a display assembly, including receiving a display panel comprising a pixel array, a plurality of first electrodes, and a plurality of second electrodes, the second electrodes insulated from the first electrodes, wherein the first and second electrodes are configured for capacitive touch sensing. The method also includes receiving a pressure sensing assembly comprising a transparent cover having a first face supporting a patterned counter electrode in the form of an interconnected conductive region formed from the union of a plurality of counter electrode elements, and a transparent piezoelectric film bonded to the first face. The method also includes bonding the pressure sensing assembly to the display panel such that the piezoelectric film is stacked between the transparent cover and the first and second electrodes, and the lateral displacements of counter electrode elements with respect to the first and second electrodes are configured to maximise a capacitance between the patterned counter electrode and the first electrodes, or between the patterned counter electrode and the second electrodes.

According to a fifth aspect of the invention, there is provided a method of optimising a touch sensor for combined capacitive touch and force sensing, the touch sensor including a plurality of first electrodes and a plurality of second electrodes, the second electrodes insulated from the first electrodes, wherein the first and second electrodes are configured for capacitive touch sensing, a transparent cover, a transparent piezoelectric film arranged between the transparent cover and the first and second electrodes, and a patterned counter electrode disposed between the transparent piezoelectric film and the transparent cover, wherein the patterned counter electrode is an interconnected conductive region formed from the union of plurality of counter electrode elements. The method of optimising the touch sensor includes mapping, for a range of lateral displacements of counter electrode elements with respect to the first and second electrodes, a capacitance between the patterned counter electrode and the first electrodes, or a capacitance between the patterned counter electrode and the second electrodes. The method of optimising the touch sensor also includes determining optimal lateral displacements for counter electrode elements which maximise the capacitance between the patterned counter electrode and the first electrodes. The method of optimising the touch sensor also includes outputting the optimal lateral displacements.

The mapping may be performed by calculating the capacitance between the patterned counter electrode and the first electrodes for each combination of lateral displacements. The mapping may include using lateral displacements corresponding to regularly spaced positions. The mapping may include using an iterative search method to determine the optimal lateral displacements. The mapping may include using lateral displacements corresponding to regularly spaced positions, followed by an iterative search method using the best of the regularly spaced positions as a starting condition. When the first and/or second electrodes are disposed in a periodic pattern, only one period worth of lateral displacements may be mapped.

The method of optimising the touch sensor may also include making the touch sensor using the optimal lateral displacements.

The method of optimising the touch sensor may also include calculating, using the optimal lateral displacements, the capacitance between the patterned counter electrode and the first electrodes, or the capacitance between the patterned counter electrode and the second electrodes, as a function of a characteristic dimension of the counter electrode elements. The method of optimising the touch sensor may also include calculating, using the optimal lateral displacements, the mutual capacitances between each pair of first and second electrodes as a function of the characteristic dimension of the counter electrode elements. The method of optimising the touch sensor may also include determining the optimal value of the characteristic dimension which maximises the value of the capacitance between the patterned counter electrode and the first electrodes subject to maintaining the mutual capacitances between each pair of first and second electrodes above an operating threshold. The method of optimising the touch sensor may also include outputting the optimal value of the characteristic dimension.

When the first and/or second electrodes are disposed in a periodic pattern, only one period worth of first and second electrode pairs may be considered. The characteristic dimension may be a width of a counter electrode line element.

The method of optimising the touch sensor may also include making the touch sensor using the optimal lateral displacements and the optimal value of the characteristic dimension.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
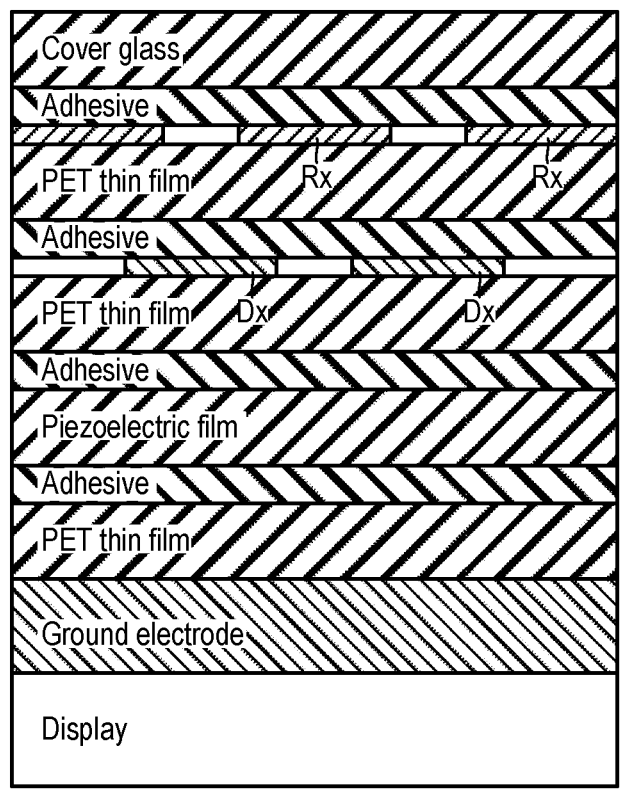
FIG. 1 is a cross-section view of an example of a touch sensor for a touch panel capable of capacitive touch sensing and piezoelectric force sensing.

Referring to FIG. 1, an example of a sensor architecture capable of capacitive touch sensing and detecting applied force based on the piezoelectric effect is shown. The drive electrodes Tx, the sensing electrode Rx and the counter electrode CE are made of a transparent, electrically-conducting material having a sheet resistance of typically less than 150Ω/□, such as indium-tin-oxide (ITO), which are deposited on transparent electrically-insulating films, such as polyethylene terephthalate (PET).

Projective capacitive (or "PCAP") touch sensing enables the location of a user's finger to be detected. A signal is applied to the drive electrode and when a user touches the screen there is a change in the charge coupled to the sensing electrode. Thus, there is a change in mutual capacitance between the drive and receive electrodes, which is measured by a touch controller integrated circuit (IC).

The force applied by the user is detected as a result of piezoelectric behaviour of a thin film whereby mechanical stress induces a net charge. To capture this, electrodes are disposed on opposite sides of a piezoelectric film, namely drive or sensing electrodes on one side, together with a counter electrode on the opposite side. The choice of whether to use drive or sensing electrodes is based on which electrode lies closer to the piezoelectric film in the sensor architecture. The signal from the force-sensing electrode is fed into a charge amplifier and the output is used to evaluate the user's force input.

In a typical sensor, sensing and drive electrodes take the form of diamond-shaped tiles, interlockingly-tessellated to form a two-dimensional array. If used, the counter electrode takes the form of an unpatterned conductive layer formed of a transparent electrically-conductive material, such as ITO.

The functions of reading-out force and capacitance from a sensor architecture such as the example sensor architecture shown in FIG. 1 may be performed using suitable electronics, for example, as described in WO 2016/10297 A1 on page 46, line 23 to page 54, line 28 and in FIGS. 21 to 29.

Sensor architectures capable of sensing touch sensing and detecting applied force, such as the one shown in FIG. 1, can suffer one or more drawbacks.

First, the stack of layers forming a sensor for combined PCAP and force sensing can be thick due to the presence of multiple films and layers of adhesive. For example, ignoring the cover glass and electrodes, the sensor shown in FIG. 1 can have a thickness of 400 μm if each dielectric layer has a thickness of 50 μm.

Secondly, typical touch sensors not having force-sensing capability tend to have only drive and sensing electrodes. If these electrodes are to be adapted for force sensing, then a piezoelectric film and a counter electrode should be added. This requires architectural modifications from the sensor manufacturer. Furthermore, when the display unit is integrated with the sensor, intermediate steps would have to be changed to accommodate the requirements of the piezoelectric and counter electrode layer.

Finally, although WO 2016/10297 A1 describes positioning a patterned counter electrode between a user and the drive and sensing electrodes, this document does not describe how to optimise the placement, dimensions or pitch of such a patterned electrode. Additionally WO 2016/10297 A1 teaches that the patterned electrode should be arranged so as to reduce the magnitude of the capacitance between the patterned electrode and the driving/sensing electrodes, in order to make the capacitance change of a users' touch easier to detect. At the time, this was considered important in order to permit PCAP detection to continue to function despite screening effects of the intervening patterned electrode.

The present invention is based, at least in part, on the inventors surprising discovery that the PCAP function may be maintained without a requirement to minimise the capacitance between the patterned electrode and the driving/sensing electrodes. Whilst minimising this capacitance may improve PCAP detection, it may also degrade force sensing performance. Surprisingly, the inventors have found that by carefully optimising the placement, dimensions or pitch of a patterned counter electrode, coupled with appropriate selection of the touch panel layer structure, the capacitance between the patterned counter electrode and the driving/sensing electrodes may instead by maximised in order to improve force detection, without significantly degrading PCAP performance. In effect, this represents the opposite of the teachings of WO 2016/10297 A1 in relation to the specific relative placement of a patterned counter electrode.

Figure 2:
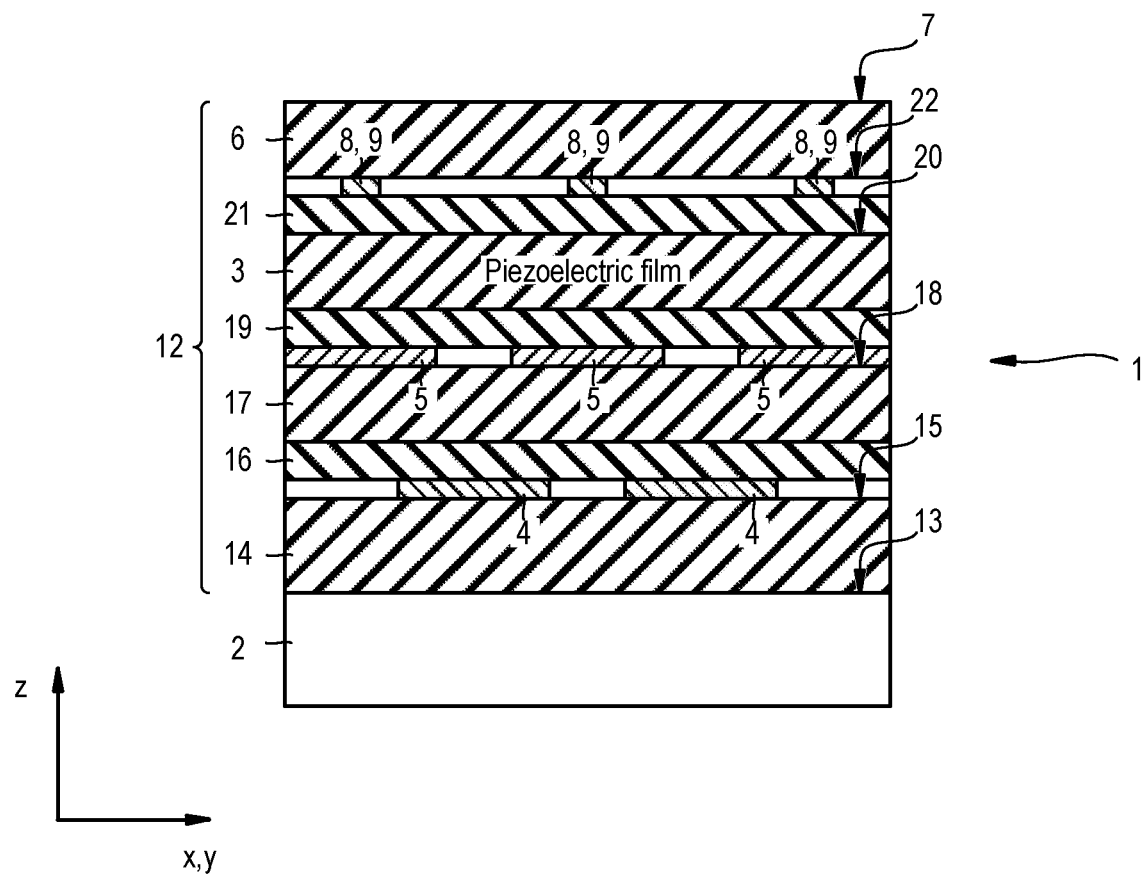
FIG. 2 is a cross-section view of a touch sensor for a touch panel capable of capacitive touch sensing and piezoelectric force sensing.
Figure 3:
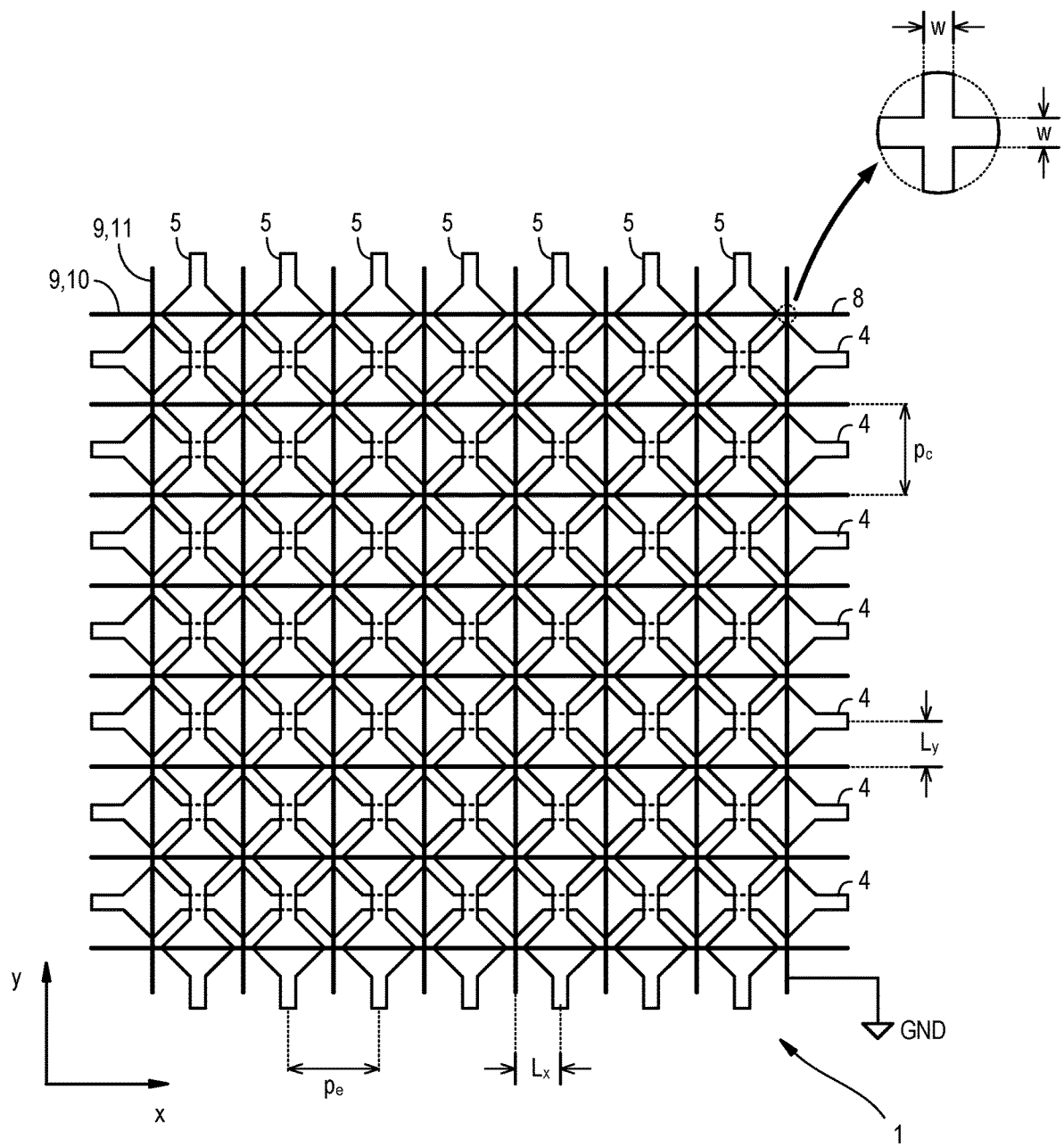
FIG. 3 is a plan view of the touch sensor shown in FIG. 2.

Referring to FIGS. 2 and 3, a touch sensor 1 for a display 2 is shown. The touch sensor 1 is capable of sensing touch and detecting force applied by a user (not shown) either directly with a finger or thumb (not shown) or indirectly, for example, using a pen or stylus (not shown), thereby depressing the sensor 1. Depending on the mechanical support of the touch sensor 1, significant in-plane strains may also be developed within a piezoelectric film 3 contained with the touch sensor The touch sensor 1 has an architecture which is referred to herein as "on-cell". As will become clear hereinafter, the on-cell architecture may help to reduce the thickness and/or the complexity of the touch sensor compared with, for example, a touch sensor having an architecture such as that shown in FIG. 1.

The touch sensor 1 is suitable for combined capacitive touch and force sensing based on the piezoelectric effect. The touch sensor 1 includes a number of first electrodes 4 and a number of second electrodes 5. The second electrodes 5 are electrically insulated from the first electrodes 4. The touch sensor 1 also includes a transparent cover 6, and the first and second electrodes 4, 5 are configured for mutual capacitive touch sensing in order to detect one or more interactions of a user or conductive stylus with a first, or input surface 7 of the transparent cover 6. The transparent piezoelectric film 3 is stacked between the transparent cover 6 and the first and second electrodes 4, 5. The touch sensor 1 also includes a patterned counter electrode 8 disposed between the transparent piezoelectric film 3 and the transparent cover 6. The patterned counter electrode 8 takes the form of an interconnected conductive region formed from the union of a plurality of counter electrode elements 9, for example x- and y-counter electrode line elements 10, 11 forming a conductive grid or mesh. In order to maximise piezoelectric charge collection, the lateral displacements L of the counter electrode elements 9 with respect to the first and second electrodes 4, 5 are configured to maximise a capacitance between the patterned counter electrode 8 and the first electrodes 4. Lateral displacements L refer to displacements parallel to the plane or planes defined by the first and second electrodes 4, 5. For example, for the configuration shown in FIG. 2, lateral displacements refer to displacements $L_x$ in the x-direction and $L_y$ in the y-direction as indicated.

Alternatively, the roles of the first and second electrodes 4, 5 may be reversed, and the lateral displacements L, $L_x$, $L_y$ of the counter electrode elements 9 with respect to the first and second electrodes 4, 5 may be configured to maximise a capacitance between the patterned counter electrode 8 and the second electrodes 5.

For example, as shown in the example of FIG. 2 the touch sensor 1 may include a stacked layer structure 12 formed on a principal surface 13 which is the surface ("upper surface" or "face") of the display 2 which is intended to be viewed by a user (not shown). The layer structure 12 is generally transparent thereby allowing the user (not shown) to see the underlying display 2.

The layer structure 12 includes, stacked in order going away (along the z-axis as drawn) from the display 2, a first transparent, electrically-insulating film 14 having a principal surface 15, first electrodes 4 in the form of a first set of transparent, patterned, co-planar electrodes 4 (in the context of the example shown in FIGS. 2 and 3 also referred to as "drive electrodes") disposed directly on the principal surface 15 of the first electrically-insulating film 14, a first transparent adhesive layer 16 (herein also referred to as "optically clear adhesive" or "OCA"), a second transparent, electrically-insulating film 17 having a principal surface 18, second electrodes 5 in the form of a second set of transparent, patterned co-planar electrodes 5 (herein also referred to as "sensing electrodes") disposed directly on the principal surface 18 of the second electrically-insulating film 17, a second transparent adhesive layer 19, a transparent piezoelectric film 3 having a principal surface 20, a third transparent adhesive layer 21, a patterned counter electrode 8 in the form of a third transparent grid-like counter electrode 8 (or "common electrode") and a transparent cover 6 (herein referred to as the "cover glass") having first and second opposite surfaces 7, 22. The first, or user input surface 7 (or "upper surface" or "face") is intended to face the user (not shown) and is the surface which receives user input. The second surface 22 (or "lower surface" or "underside") faces the rest of the layer structure 12 and may directly support the grid-like counter electrode 8. For example, the patterned counter electrode 8, may be formed on the second or lower surface 22 facing the transparent piezoelectric film 3 and opposite to the user input surface 7. The second surface 22 may be in direct contact with the transparent piezoelectric film 3, or there may be intervening layers such as adhesive layer 21.

The first and second electrically-insulating films 14, 17 are made from polyethylene terephthalate (PET), although other suitable thin, flexible and insulating plastics materials can be used.

The first, second and counter electrodes 4, 5, 8 are made from indium-tin-oxide (ITO) or indium zinc oxide (IZO), although other conductive materials, such as aluminium, copper, silver or other metals can be used. The first, second and third electrodes 4, 5, 8 may be formed from a conductive polymers such as polyaniline, polythiphene, polypyrrole or poly(3,4-ethylenedioxythiophene) polystyrene sulfonate (PEDOT/PSS). The first, second and counter electrodes 4, 5, 8 may be formed from a metal mesh, nanowires, such as silver nanowires, graphene or carbon nanotubes. The first and second electrodes 4, 5 will typically be formed of the same material. However, the counter electrode 8 need not be made from the same materials as the first and second electrodes 4, 5. For example, the first and second electrodes 4, 5 may be formed from ITO, and the third electrode 8 may be formed from metal nanowires or metal mesh.

The piezoelectric film 3 is preferably formed from a piezoelectric polymer, such as polyvinylidene fluoride (PVDF). However, the piezoelectric film 3 may be formed from a piezoelectric ceramic such as lead zirconate titanate (PZT).

The architecture of the touch sensor 1 may be described as a glass-film-film-film (GFFF) architecture having two electrically-insulating layers 14, 17 and one piezoelectric layer 3. The piezoelectric layer 3 lies above the first and second sets of electrodes 4, 5 which can be used as driving electrodes (herein also referred to as "Tx electrodes" or simply "Tx") and sensing electrodes (herein also referred to as "Rx electrodes" or simply "Rx") respectively. Alternatively, the first and second electrodes 4, 5 may function as Rx electrodes and Tx electrodes respectively. This arrangement, i.e., piezoelectric layer 3 lies above (closer to the user input surface 7) the first and second sets of electrodes 4, 5, can make it easier to integrate the piezoelectric layer 3 into an existing non-force-sensing touch sensor architecture.

The grid-like counter electrode 8 (also referred to as a "common electrode", "counter electrode" or "grid") of the example shown in FIGS. 2 and 3 comprises counter electrode elements 9 in the form of first and second sets of perpendicular, counter electrode line elements 10, 11. The first and second sets of counter electrode line elements 10, 11 form the counter electrode 8 as a single conductive region. The counter electrode line elements 10, 11 have a thickness w, which preferably lies in a range between 10 and 500 μm, and a pitch $p_c$, which preferably lies in a range between 0.2 and 2 cm. The pitch $p_c$ of the counter electrode line elements 10, 11 is typically greater than or equal to a pitch $p_e$ of the first and second electrodes 4, 5. The grid-like counter electrode 8 is grounded and enables force sensing without degrading a projective capacitive signal sensed using first and second sets of electrodes 4, 5. This can allow force-sensing capability to be integrated into an existing non-force-sensing touch sensor architecture. In the context of an unearthed device such as a mobile phone, grounded means connected to system ground, for example a supply rail of the power supply.

In the example shown in FIG. 1, the first electrodes 4 are disposed in a first x-y plane, and the second electrodes 5 are disposed in a second x-y plane parallel to the first x-y plane. However, in other examples, the first and second electrodes 4, 5 may be disposed in a substantially co-planar configuration, for example with the first and second electrodes 4, 5 substantially in one x-y plane. Such co-planar configurations require either the first electrodes 4 or the second electrodes 5 to include jumpers or similar structure to prevent short circuits at intersections of the first and second electrodes 4, 5.

In the example shown in FIG. 3, the patterned counter electrode 8 includes a counter electrode element 9, 10 corresponding to each first electrode 4, and similarly includes a counter electrode element 9, 11 corresponding to each second electrode 5. However, one-to-one correspondence of counter electrode elements 9, 10, ii with first and second electrodes 4, 5 is not essential, and in some other examples the patterned counter electrode 8 may include a counter electrode element 9, 10 corresponding to every $N^{th}$ first electrode 4, with N an integer greater than or equal to two. Similarly, in some examples the patterned counter electrode 8 may include a counter electrode element 9, 11 corresponding to every $M^{th}$ second electrode 5, with M an integer greater than or equal to two. The pitch $p_c$ of counter electrode elements 9, 10 with respect to the first electrodes 4 does not need to be equal to the pitch of counter electrode elements 9, 11 with respect to the second electrodes 5. For example, there could be a first counter electrode line element 10 for every $2^{nd}$ first electrode 4, and a second counter electrode line element 11 for every $3^{rd}$ second electrode 5.

Counter Electrode

Figure 4:
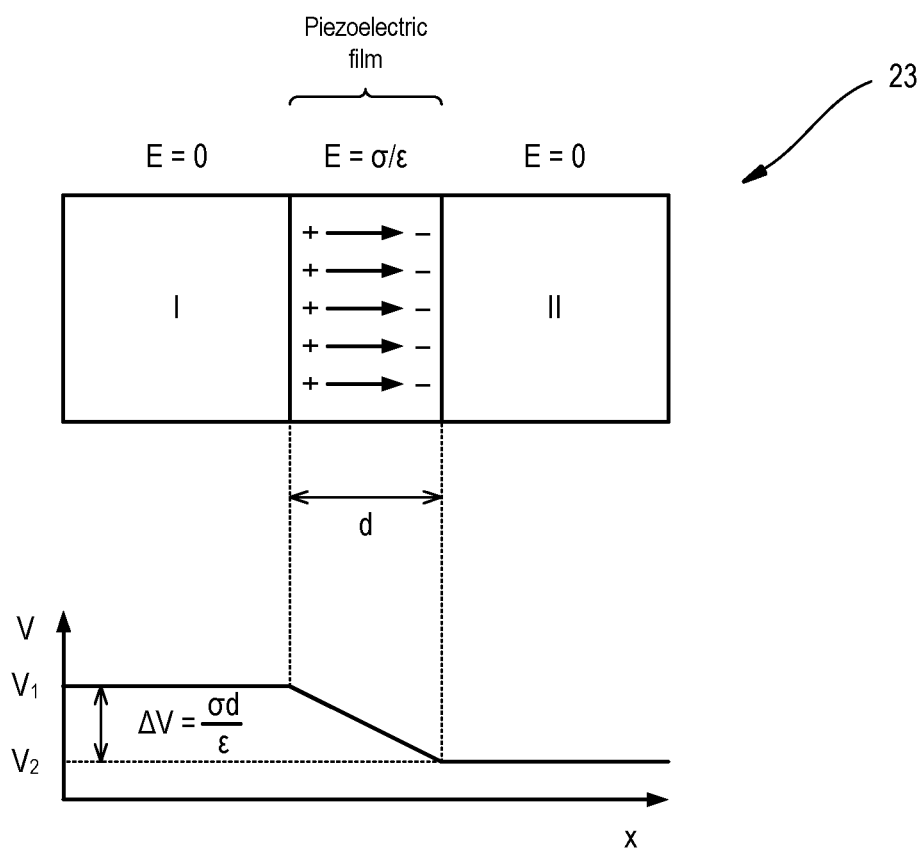
FIG. 4 illustrates a piezoelectric layer and a plot of electric field across the piezoelectric layer.

Referring also to FIG. 4, a simplified model 23 of a touch sensor can be used to help understand the role of the counter electrode 8 (FIG. 3).

A piezoelectric film may be considered to generate two plates of charge with opposite polarity when a force is applied. The piezoelectric layer 3 is an example of a piezoelectric firm. The distribution of the charges creates a potential field in the space in between the charges. Assuming the charge density on both sides to be σ and −σ ($C \cdot cm^{-2}$) and using an infinite plane approximation, a graph of potential field against distance can be plotted.

The potential field can be approximated using an infinite plane approximation since the thickness d of the piezoelectric film is much smaller than the area of the charge plates. The potentials in first and second regions I, II on either side of the piezoelectric region are uniform and equal $V_1$ and $V_2$ respectively. The potential difference ΔV between the first and second regions I, II is:

$$\Delta V = V_1 - V_2 = \sigma d/\varepsilon \quad (1)$$

where d is the thickness of the piezoelectric film and ε is its dielectric constant.

To sense the charge generated by the piezoelectric film, electrodes are placed in the potential field. In ideal cases, the charge can only be sensed when electrodes are placed in the first and second regions I and II, thus the regions are conductive regions.

An electrode E1 (FIG. 5) can be connected to a charge amplifier and an electrode E2 (FIG. 5) can be connected to ground GND. The charge flowing through the circuit will be equal to the amount of charge required to cancel the potential difference. Therefore, if the self-capacitance between the electrodes E1, E2 is $C_{12}$, then the charge collected $Q_C$ should follow:

$$Q_C = C_{12}(V_1 - V_2) = C_{12}\sigma d/\varepsilon \quad (2)$$

The collected charge $Q_C$ should be increased to improve sensitivity of the sensor. This can be achieved by increasing the capacitance $C_{12}$ and by increasing the thickness d of the piezoelectric film. For a touch sensor 1, the capacitance $C_{12}$ comprises the capacitance between a first electrode 4 or a second electrode 5 providing the electrode E1 and the counter electrode 8 providing the electrode $E_2$, separated by the transparent piezoelectric film 3.

Circuit Model and Analysis

Figure 5:
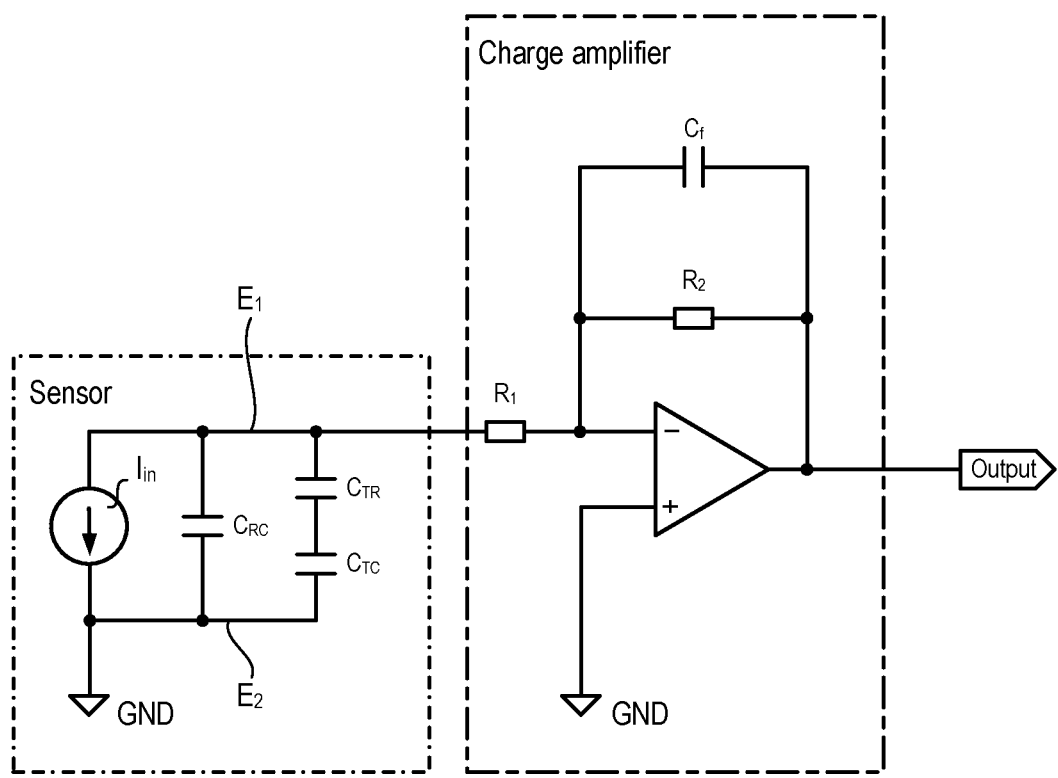
FIG. 5 is a schematic circuit diagram of a charge amplifier and an equivalent circuit model of a touch sensor.

Referring also to FIG. 5, the output of the touch sensor 1 (FIG. 2) in response to straining of the piezoelectric layer 3 can be modelled as a current pulse in parallel with capacitance $C_{RC}$ (second and counter electrodes 5, 8), and a series of a capacitances $C_{TR}$ (between first and second electrodes 4, 5) and the capacitance $C_{TC}$ (between first and counter electrodes 4, 8). Hereinafter, the capacitance $C_{RC}$ may also be referred to as the "self-capacitance" of the second electrode 5, because this represents the capacitance of the second electrode 5 to ground. Similarly, the capacitance $C_{TC}$ may also be referred to as the "self-capacitance" of the first electrode 4. The capacitance $C_{TR}$ represents the mutual capacitance between a pair of first and second electrodes 4, 5 which is the object of PCAP measurements, and may also be referred to as the "mutual-capacitance" $C_m$ hereinafter. The current source $I_{in}$ should follow:

$$I_{in} = Q_C \cdot \delta(t) \quad (3)$$

where $I_{in}$ represents a current source in the equivalent circuit of the touch sensor 1, $Q_C$ is the charge collected on the touch sensor 1 (see Equation (2)) and $\delta(t)$ is an impulse function. Regarding the current source $I_{in}$, the charge produced by the piezoelectric sensor is modelled as an instantaneous pulse of current $I_{in}$ at t=0. This current pulse $I_{in}$, which equivalent to $dQ_C/dt$ by definition, is in this case equal to $Q_c \cdot \delta(t)$. The impulse function (t) is centred at t=0.

The frequency domain transfer function of the circuit shown in FIG. 5 can be derived as:

$$H(\omega) = V_{out}(\omega)/I_{in}(\omega) = R_2/(1+j\omega R_2 C_f) \quad (4)$$

In which $R_2$ is a feedback resistance and $C_f$ is a feedback capacitance, as shown in FIG. 5. Therefore, the output $V_{out}$ should follow:

$$V_{out}(\omega)) = (R_2/(1+j\omega R_2 C_f))I_{in}(\omega) = (R_2 Q_C/1+j\omega R_2 C_f) \quad (5)$$

and, in the time-domain, should follow:

$$V_{out}(t) = (Q_C/C_f) \cdot e[-t/R_2 C_f] \cdot u(t) \quad (6)$$

where u(t) is the step function, centred about t=0. Substituting $Q_C$ from Equation (2), the following is obtained:

$$V_{out}(t) = (C_S \sigma d/\varepsilon C_f) \cdot e[-t/R_2 C_f] \cdot u(t) \quad (7)$$

where $C_{12}$ in Equation (2) has also been replaced by $C_S = C_{RC}$, which is the self-capacitance of a second electrode 5 (i.e. the capacitance between the second electrode 5 and the grounded counter electrode 8). In other examples, if the first electrodes 4 were used as Rx electrodes, then the relevant self-capacitance would be $C_S = C_{TC}$. The electrodes closest to the counter electrode 8 are preferred in order to maximise collection of piezoelectric charges. As can be seen, the response of the touch sensor 1 for applied force is not significantly affected by mutual capacitance and other parasitic capacitances on the signal path.

Modelling of Counter Electrode Element Lateral Displacements on Force and Capacitive Sensing Referring again to FIGS. 2 and 3, electrostatic models can be built to represent the touch sensor 1. Values for relative permittivity and conductivity of the materials used in the model are set out in Table I below:

TABLE I

|  | Relative permittivity $\varepsilon_r$ | Conductivity (kSm$_{-1}$) |
| --- | --- | --- |
| Cover glass | 7 | — |
| Adhesive | 3.8 | — |
| PDFA | {7.4, 9.3, 7.6} | — |
| PET | 3.7 | — |
| ITO | 3.3 | 50 |

Figure 6:
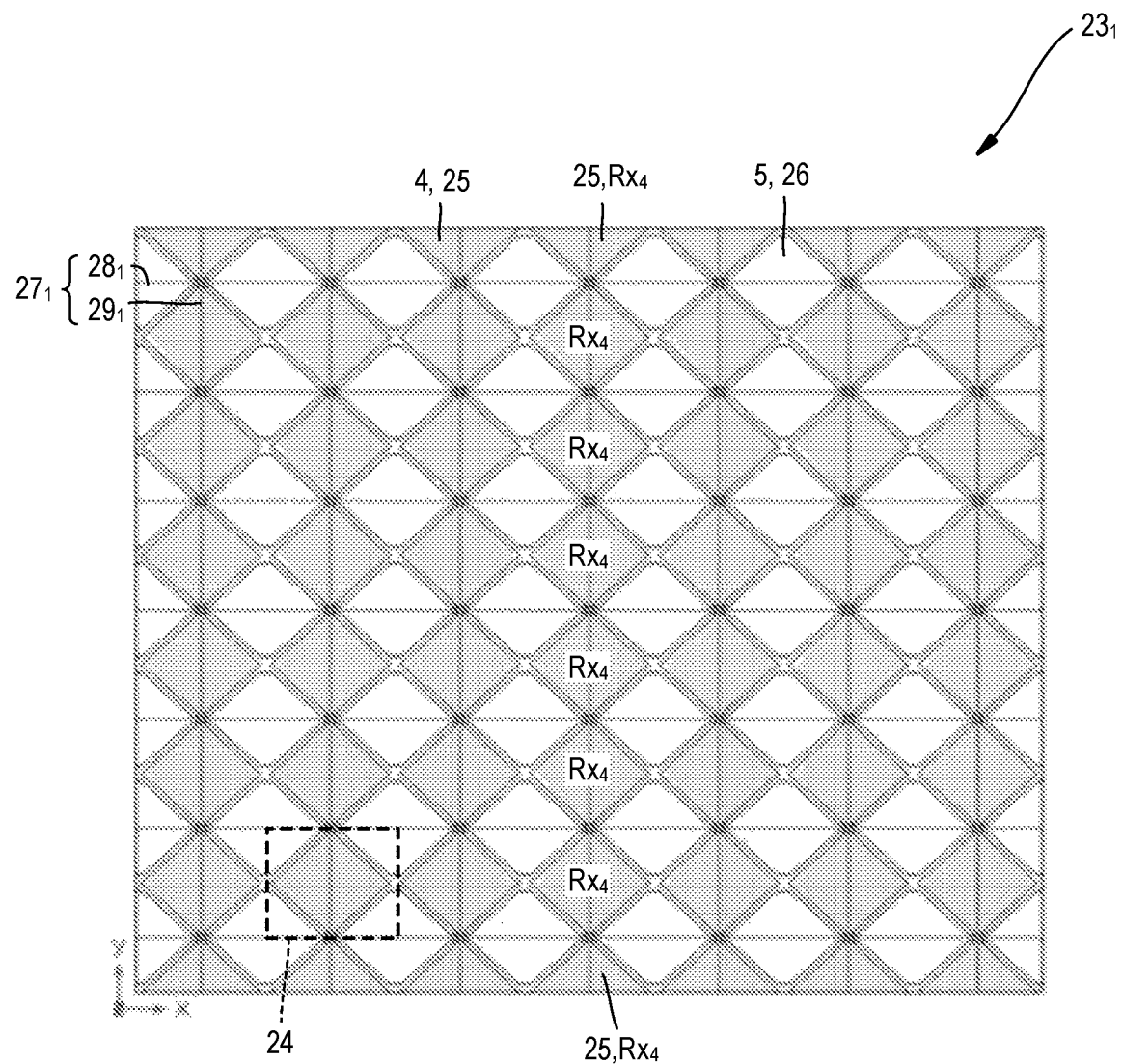
FIG. 6 is a plan view of a first configuration of part of a sensor comprising an array of sub-cells and a counter electrode having counter electrode line elements positioned every one sub-cell.
Figure 7:
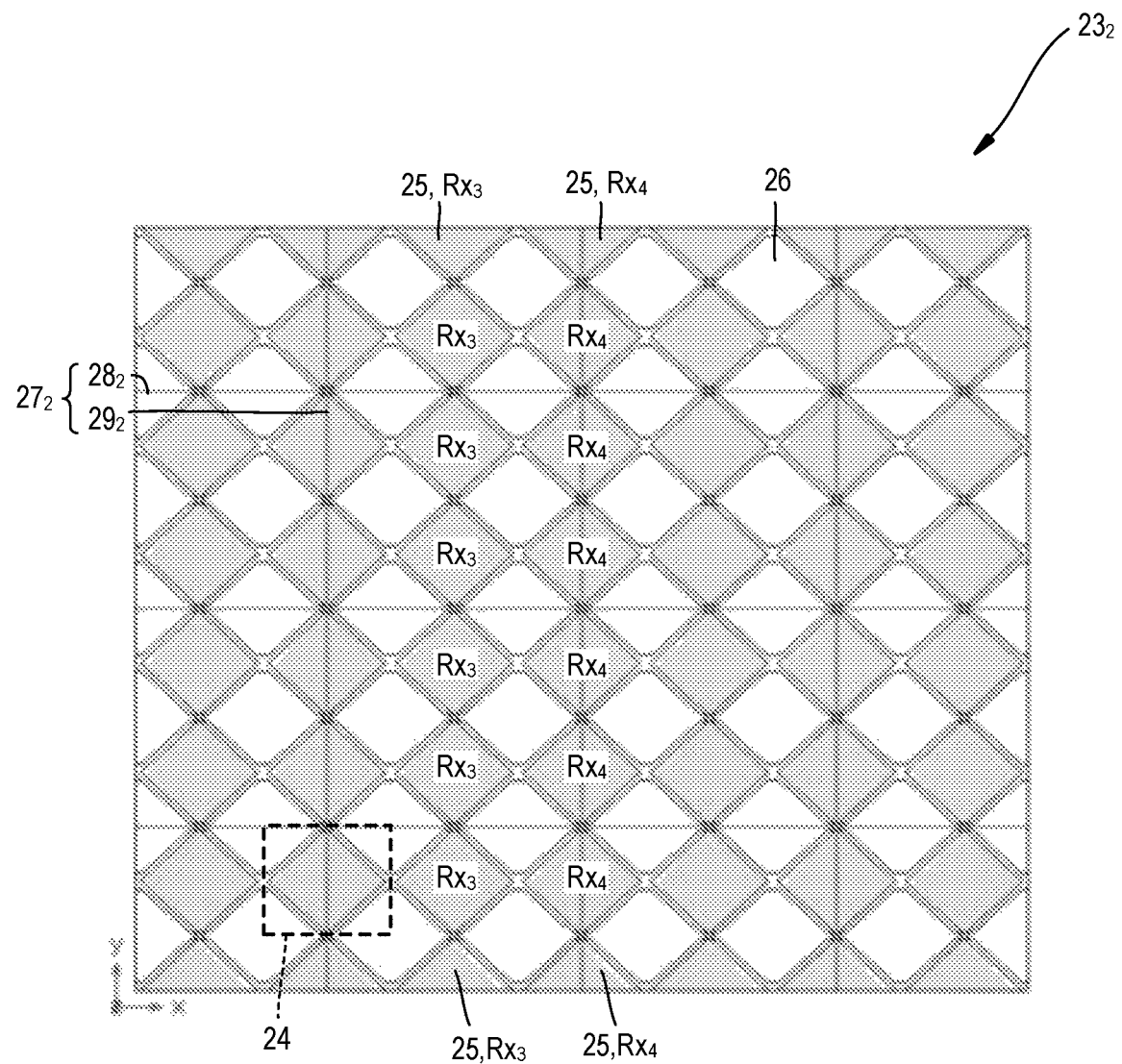
FIG. 7 is a plan view of a second configuration of an array of sub-cells and a counter electrode having counter electrode line elements positioned every two sub-cells.

Referring also to FIGS. 6 and 7, the models $23_1$, $23_2$ each consists of an array of 7×7 sub-cells 24 including seven sensing electrodes 25 (shown shaded) and seven drive electrodes 26. In general, the sensing electrodes 25 may correspond to whichever of the first and second electrodes 4, 5 is serving as the Rx electrodes, whilst the drive electrodes 26 may correspond to whichever of the first and second electrodes 4, 5 is serving as the Tx electrodes. Consequently, the sensing electrodes 25 may be either the first or second electrodes 4, 5.

Two different configurations $27_1$, $27_2$ of counter electrode elements 9 are modelled to identify their effect on the relevant self-capacitances ($C_{RC} = C_S$, $C_{TC}$), mutual capacitances ($C_{RT} = C_m$) and possible charge collection regarding the charge generated from a piezoelectric layer 3 which is strained in response to an applied force.

Referring also to FIG. 6, the first configuration $27_1$ is modelled in the form of seven counter electrode line elements $28_1$ (hereinafter referred to as "first counter electrode line elements" or "horizontal counter electrode line elements") running parallel to the drive electrodes 26 and seven counter electrode line elements $29_1$ (hereinafter referred to as "second counter electrode line elements" or "vertical counter electrode line elements") running parallel to the sensing electrodes 25. This means that the counter electrode line elements $28_1$, $29_1$ are repeated every sub-cell. A sub-cell is equivalent to a unit cell for the repeating pattern formed by the electrodes 25, 26, when viewed along the z-axis as drawn in FIG. 6. It may be noted that the a sub-cell may or may not be equivalent to a unit cell for the repeating pattern formed by the electrodes 25, 26 in combination with the counter electrode line elements $28_1$, $29_1$, when viewed along the z-axis as drawn in FIG. 6.

Referring also to FIG. 7, a second configuration $27_2$ consists of three counter electrode line elements $28_2$ ("horizontal counter electrode line elements") running parallel to the driving electrodes 26 and three counter electrode line elements $29_2$ ("vertical counter electrode lines") lines running parallel to sensing electrodes 25. This means that the counter electrode lines $28_2$, $28_2$ are repeated every two sub-cells. Each unit cell of the second configuration includes one horizontal counter electrode line element $28_2$, one vertical counter electrode line element $29_2$, and four sub-cells 24 (two by two) of the sensing and drive electrodes 25, 26.

Self-capacitance $C_S$, mutual capacitance $C_m$ and charge collection are simulated by shifting the horizontal counter electrode lines $28_1$, $28_2$ by modifying $L_y$, while keeping the vertical counter electrode line elements $29_1$, $29_2$ in their original positions, i.e., as shown in FIGS. 6 and 7.

First Configuration

The self-capacitance $C_S$ of a sensing electrode 25 can be simulated to determine the effect of the shifting of the counter electrode line elements $28_1$, $29_1$. Since the counter electrode line elements $28_1$, $29_1$ are spaced every sub-cell 24, only one sensing electrode 25 is chosen for simulation purposes. The sensing electrode 25 chosen is labelled "$Rx_4$" and is numbered by numerical order from left to right. Regarding the effect on charge collection through the sensing electrodes 25, the same simulation is carried out but in this case two additional planes of charge generation are included on the piezoelectric film.

Figure 8:
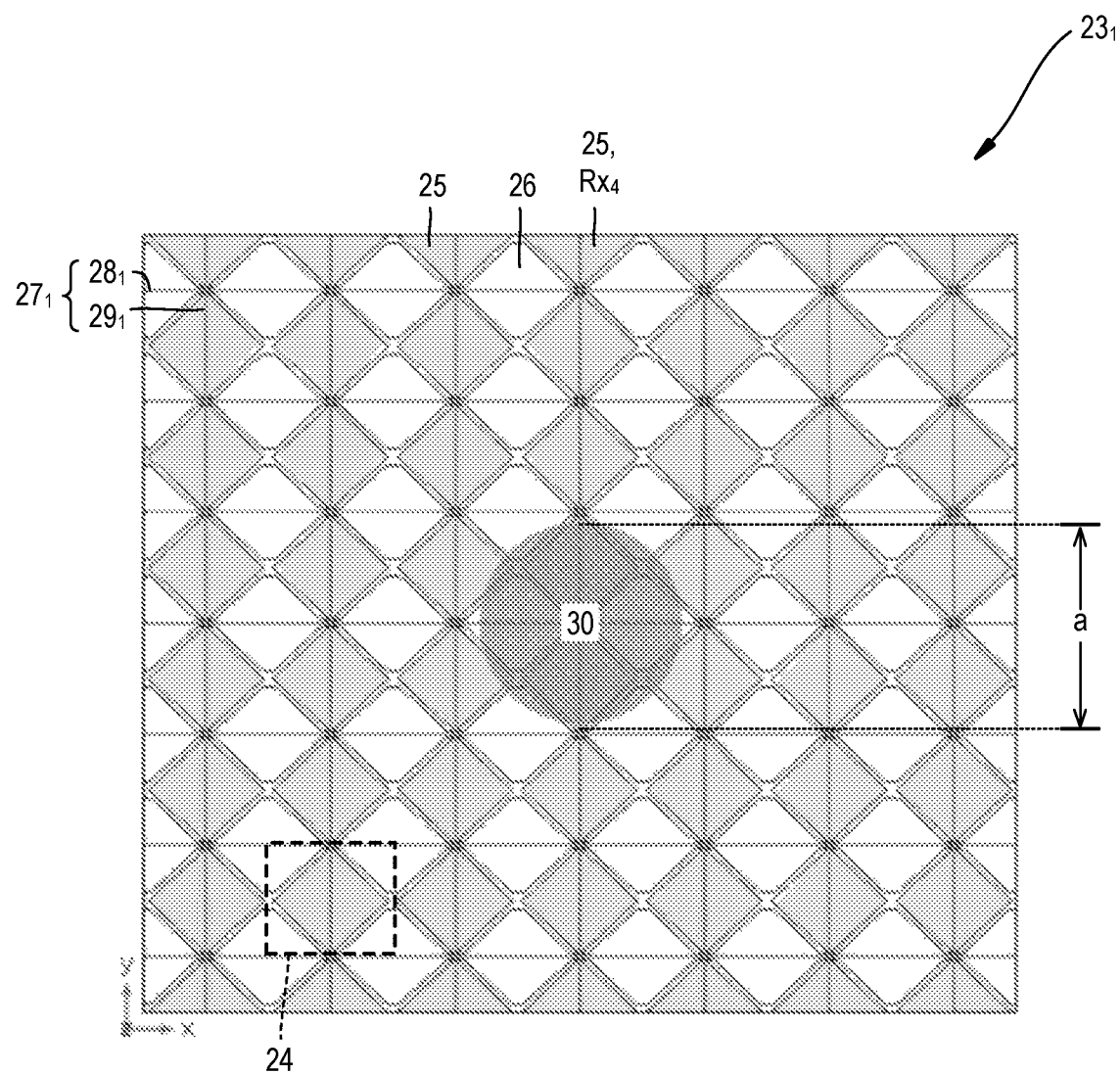
FIG. 8 is a plan view of the first configuration shown in FIG. 6 and a region in which charge may be generated due to a user depressing the sensor.

Referring also to FIG. 8, the area of the generated charge 30 was modelled as circular, with a diameter a=8 mm and represents a single touch/push area of a human finger on the sensor. The charge density is set to 10 pC mm$^2$ and so the net charge provided is 502.65 pC.

Figure 9:
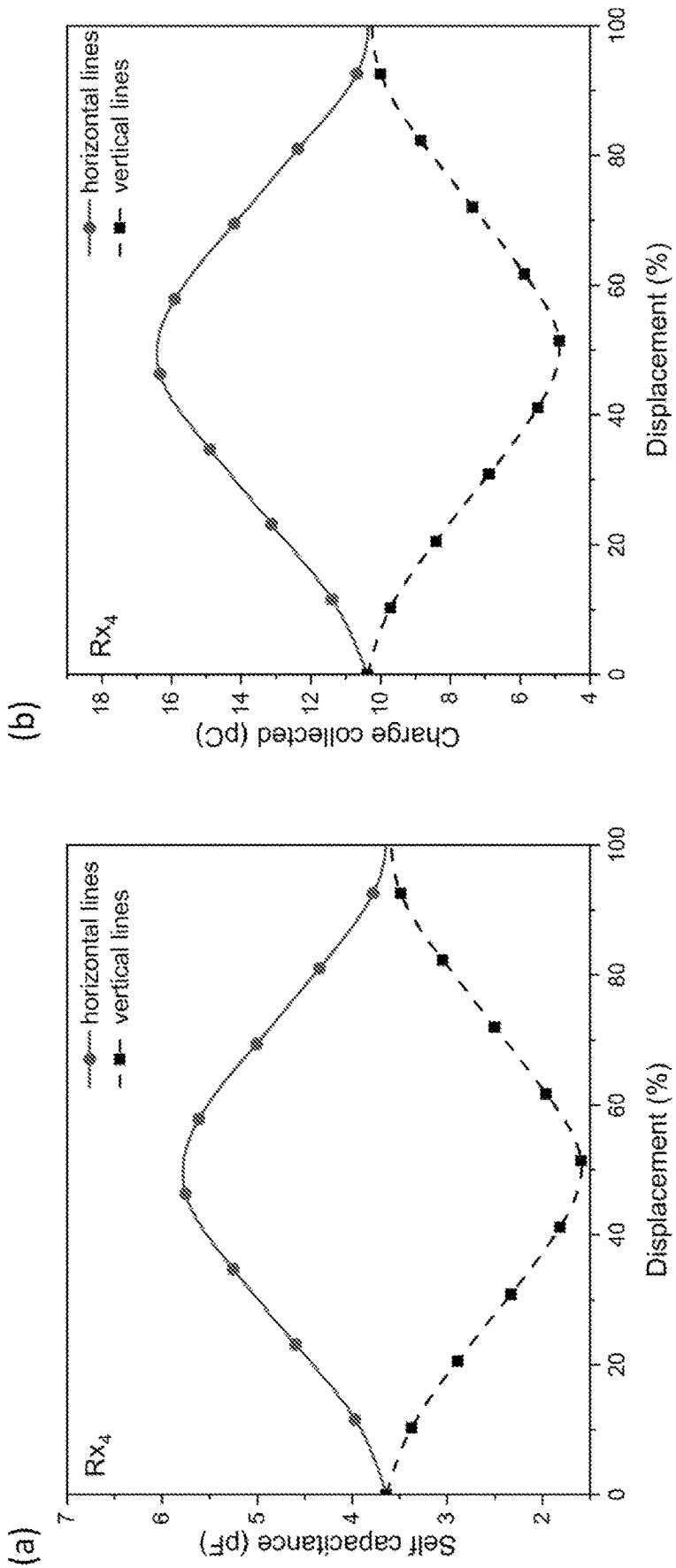
FIG. 9a is a plot of self-capacitance against displacement for a fourth sensing electrode $R_{x4}$ with respect to counter electrode line elements for the first configuration shown in FIG. 6, where 100% displacement corresponds to a shift of one sub-cell.
FIG. 9b is a plot of charge collected from a fourth sensing electrode $R_{x4}$ as a function of electrode displacement with respect to counter electrode line elements for the first configuration shown in FIG. 6, where 100% displacement corresponds to a shift of one sub-cell.

Referring also to FIG. 9a, the self-capacitance of the fourth sensing electrode $Rx_4$ is at a minimum when there is no horizontal counter electrode line element $28_1$ on top of it (i.e., 0% displacement with respect to the initial position shown in FIG. 6). When the horizontal counter electrode line elements $28_1$ are shifted by 50% (i.e., by half a sub-cell 24), then the self-capacitance $C_S$ reaches a maximum magnitude of around 5.8 pF. The self-capacitance of the fourth sensing electrode $Rx_4$ with respect to the vertical counter electrode line elements $29_1$ behaves in the same manner. When there is no vertical counter electrode line element $29_1$ on top of the fourth sensing electrode $Rx_4$ (i.e., 50% displacement with respect to the initial position shown in FIG. 6), the self-capacitance $C_S$ exhibits a minimum, which in this case is 1.6 pF. In the initial position, where vertical counter electrode line element 29 lies above the fourth sensing electrode $Rx_4$ (i.e., 0% displacement with respect to FIG. 6), the self-capacitance $C_S$ shows a maximum magnitude, which in this case is 3.6 pF.

Referring also to FIG. 9b, it may be observed the charge accumulated by the fourth sensing electrode $Rx_4$ is also predicted to follow the same behaviour.

The first configuration $27_1$ shows a periodic effect on self-capacitance and charge collection for both horizontal and vertical counter electrode line elements $28_1$, $29_1$ displacements having a periodicity of one sub-cell 24. This means that there is no need to combine two adjacent sensing electrodes 25 into a single force sensing amplifier. In this way, a better lateral resolution in force sensing is obtained.

Figure 10:
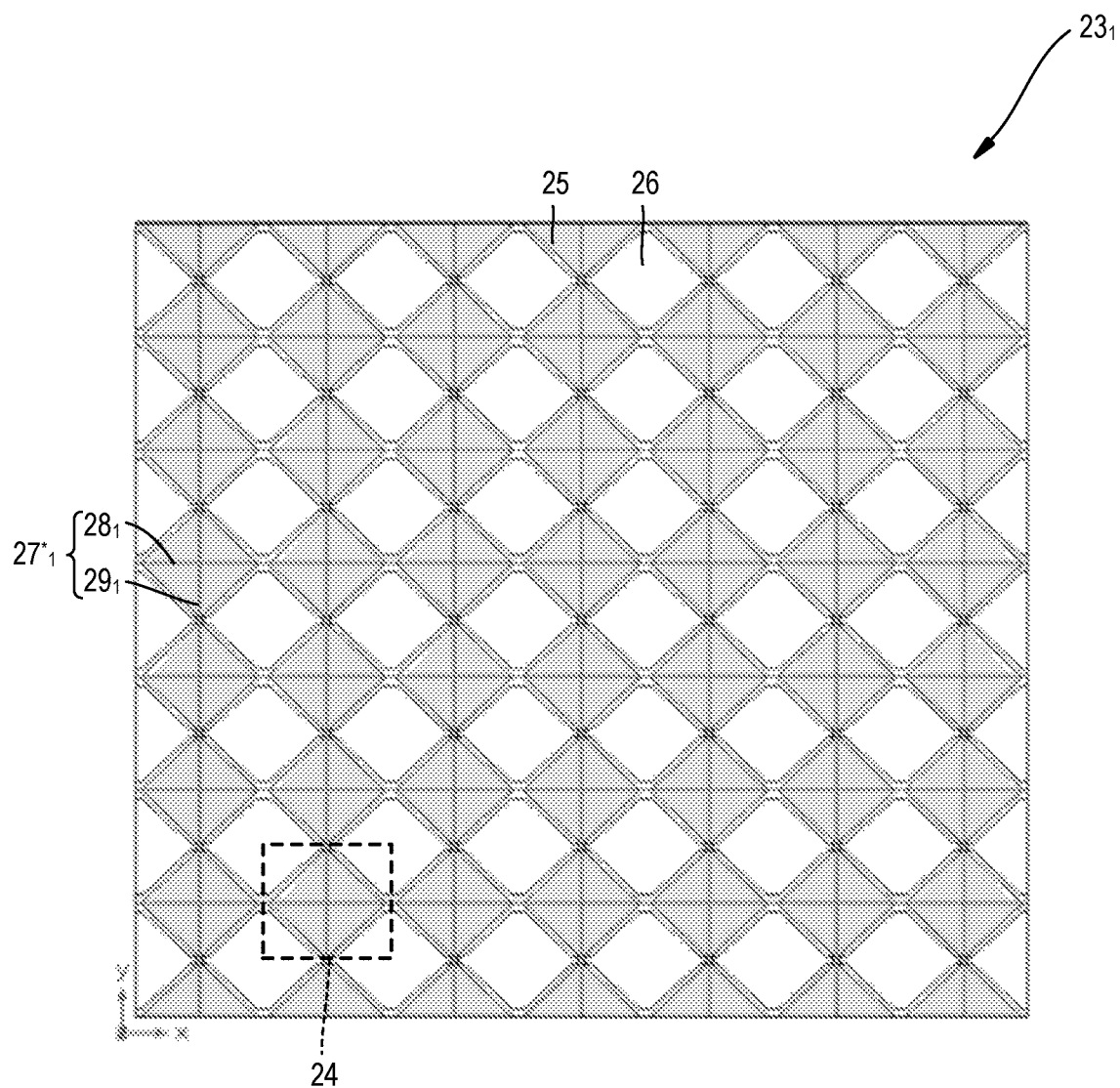
FIG. 10 is a plan view of a preferred first configuration in which the counter electrode line elements have lateral displacements which maximise self-capacitance.

Referring also to FIG. 10, to achieve the maximum efficiency of force sensing for an optimised first configuration $27°_1$, the counter electrode 8 line elements $28_1$, $29_1$ should be placed in such a way that the horizontal and vertical line elements lie in the middle of the sub-cells 24 as indicated. This means a displacement of 50% for the horizontal line elements $28_1$ and 0% for the vertical line elements $29_1$ with respect to their initial position shown in FIG. 6. This configuration results in a maximum self-capacitance which in the example of the first model $23_1$ is 5.8 pF.

Maximizing the self-capacitance through positioning of the counter electrode 8 elements 9, for example counter electrode line elements $28_1$, $29_1$ can help to maximise force-sensing efficiency that can be achieved for any periodic pattern of sensing and drive electrodes 25, 26. Meanwhile, to maintain touch-sensing efficiency, the counter electrode line elements $28_1$, $29_1$ should interfere as little as possible with the mutual-capacitance $C_m$ of the drive and sensing electrodes 25, 26. In practice, this means that the counter electrode line elements $28_1$, $29_1$ should preferably avoid screening interactions between the drive and sensing electrodes 25, 26 and a user of the touch panel 1.

The mutual-capacitance is the sum of capacitances due to overlapping areas of drive and sensing electrodes 25, 26 and to fringing fields created at adjacent boundaries (or "interfaces") of the drive and sensing electrodes 25, 26.

The mutual-capacitance $C_m$ (e.g. $C_{TR}$) was also simulated for the first configuration $23_1$ shown in FIG. 6.

Figure 11:
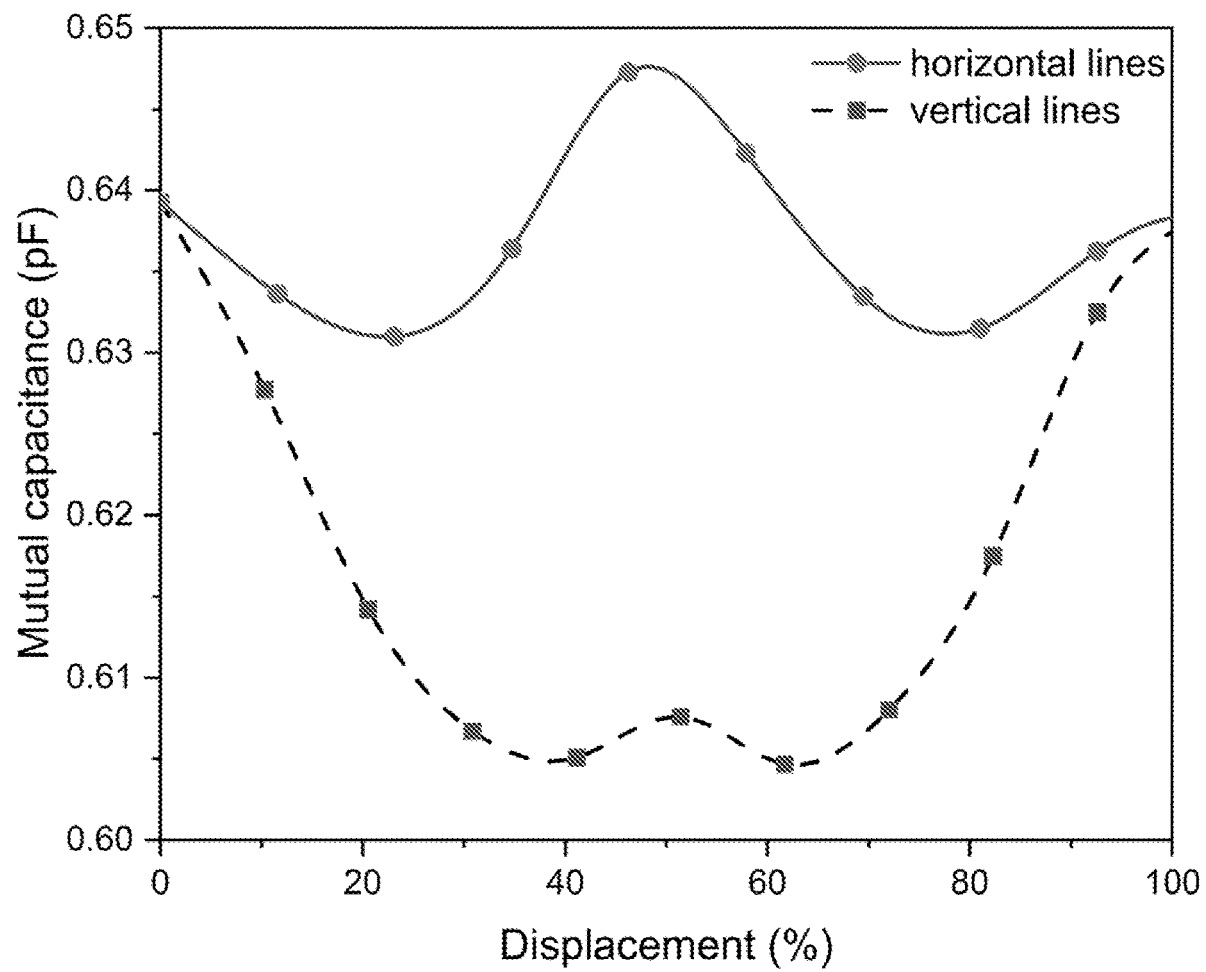
FIG. 11 is a plot of mutual capacitance between a sensing electrode Rx and a drive electrode Tx as a function of lateral displacements with respect to horizontal and vertical counter electrode line elements.

Referring to FIG. 11, behaviour of mutual-capacitance $C_m$ as a function of displacement for horizontal and vertical counter electrode line elements $28_1$, $29_1$ is shown. It is seen that the maximum mutual-capacitance $C_m$ occurs when the horizontal counter electrode line elements $28_1$ are shifted by a displacement of 50% with respect to their initial position (i.e., so that each lies in the middle of one of the diamond shapes making up the sensing electrodes 25) and the vertical counter electrode line elements $29_1$ are left in their initial position (i.e., so that they lie in the middle of the sensing electrodes 25). Accordingly, the mutual-capacitance has a maximum magnitude, which in the case of the first model $23_1$ is 0.647 pF.

Figure 12:
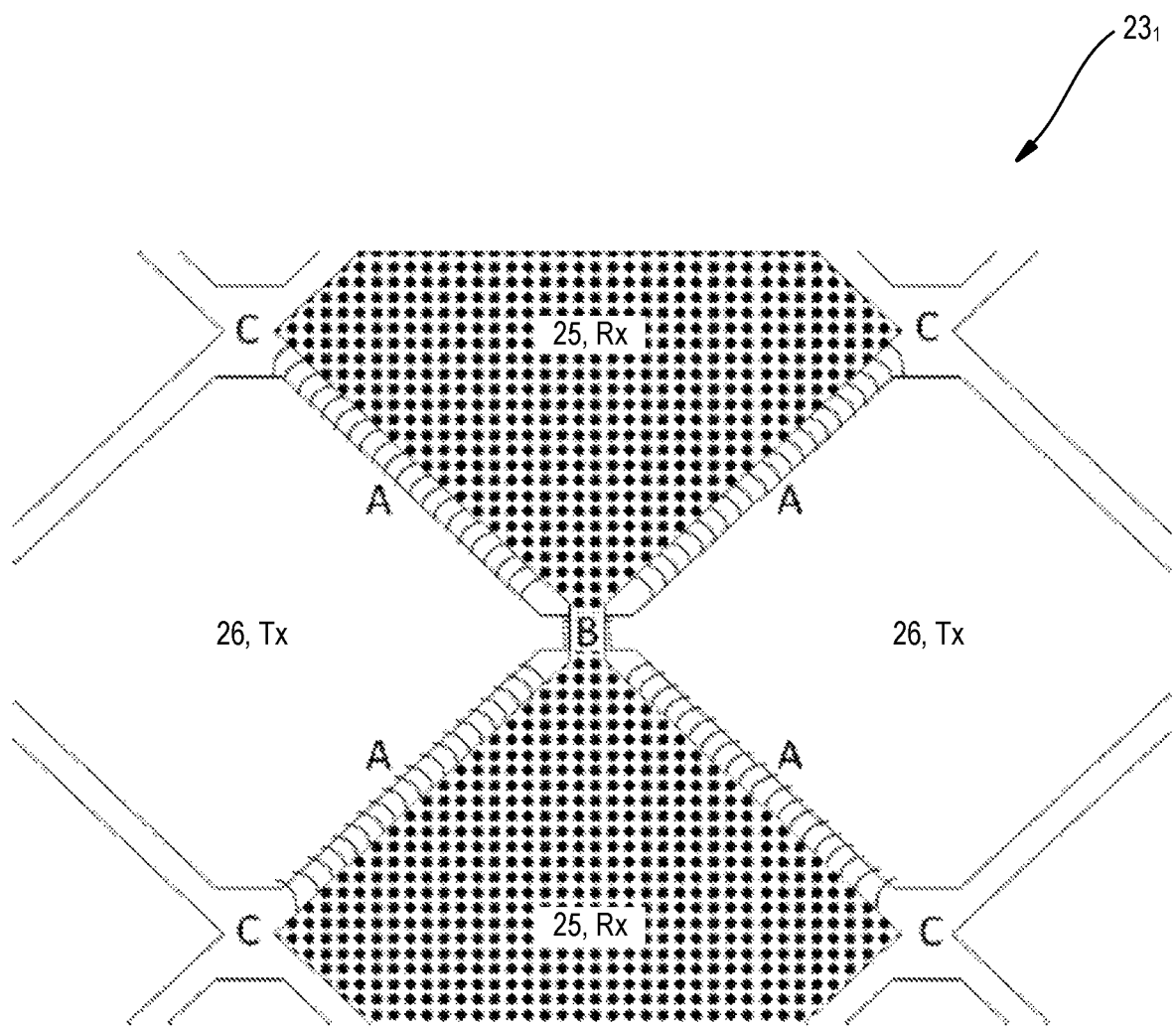
FIG. 12 is a magnified plan view of part of a sensor illustrating electric field fringing lines responsible for mutual-capacitance between sensing electrode Rx and drive electrode Tx in three different regions.

Referring also to FIG. 12, first, second and third regions A, B, C between sensing and driving electrodes 4, 5 are shown for a region which encompasses a sub-cell 24. A first region A is located between adjacent drive and sensing electrodes 25, 26 ("adjacent boundary region"). A second region B is found where the sensing electrode 25 crosses over the drive electrode 26 ("cross-over region"). A third region C is found in a void between two drive electrodes 26 and between two adjacent sensing electrodes 25 ("void region").

The cross-over region B has the strongest fringing field, followed by the adjacent-boundary regions A and then the void region C. When a ground line, for example horizontal and/or vertical counter electrode line elements $28_1$, $29_1$ sits on top of any one of these regions, it interferes with the fringing field lines and reduces the net mutual-capacitance $C_m$. To reduce this interference and increase possible mutual-capacitance $C_m$, the ground lines should be placed accordingly.

If the horizontal counter electrode line elements $28_1$ are considered, then they should run above the void region C where the field is weakest. If the vertical counter electrode line elements $29_1$ are considered, they too could be positioned so that they pass over the void region C. However, it is even better for the vertical counter electrode line elements $29_1$ to run over the cross-over region B. This is because there is no interference when the vertical counter electrode line elements $29_1$ pass over the cross-over region B (i.e., when they lie over the middle of the sensing electrodes 25).

Second Configuration

The inventors have surprisingly discovered that the pitch $p_c$ of counter electrode line elements 1o, 11, for example horizontal and vertical counter electrode line elements 28, 29 forming a grid-like counter electrode 8 may be larger, or even considerable larger, then the pitch $p_c$ of the first and second electrodes 4, 5, such as sensing and drive electrodes 25, 26. Whilst it would be expected that breaking the one-to-one correspondence of counter electrode 8 line elements 9, 10, 11, 28, 29 to electrodes 4, 5, 25, 26 would result in a significant degradation of the force sensing performance, the inventors have found that this is not necessarily the case. Using a relatively sparse counter electrode 8 may, amongst other effects, reduce the cost of materials and/or processing for the counter electrode 8, reduce the potential optical impact of the counter electrode 8, and/or reduce the complexity of manufacture.

The relative positioning of the counter electrode elements 9 of a relatively sparse counter electrode 8 with respect to the first and second electrodes 4, 5 may be optimised in a similar manner to a counter electrode 8 having a one-to-one correspondence between counter electrode elements 9 and first and second electrodes 4, 5.

For example, referring again to FIG. 7, for the second configuration $27_2$ having a spacing of the counter electrode line elements $28_2$, $29_2$ greater than one sub-cell 24, this can affect the force response resulting in different effects and behaviour. To simulate the different effects, a grid-like counter electrode 8 formed from counter electrode line elements $28_2$, $29_2$ spaced every two sub-cells 24 was modelled. Since the counter electrode line elements $28_2$, $29_2$ are spaced every two sub-cells 24, two different sensing electrodes 25 were modelled to see how they are affected by the shifting of the counter electrode lines elements $28_2$, $29_2$. Third and fourth sensing electrodes 25 are labelled "$Rx_3$" and "$Rx_4$" and are numbered by numerical order from left to right as shown in FIG. 7.

Referring also to FIG. 13a, the self-capacitance $C_S$ of the third sensing electrode 25, $Rx_3$ is at a minimum when there is no vertical counter electrode line element $29_2$ on top of it (i.e., 0% displacement with respect to FIG. 7). When the counter electrode line elements $28_2$, $29_2$ are shifted by 100%, i.e., by 1 sub-cell, then self-capacitance $C_S$ reaches its maximum magnitude, in this case, of around 3.25 pF. The self-capacitance $C_S$ of the third sensing electrode $Rx_3$ behaves in the same manner for the horizontal counter electrode line elements $28_2$. However, in this case, the periodicity from minima to maxima happens every 50% (i.e., every half sub-cell).

Referring also to FIG. 13b, the self-capacitance of the fourth sensing electrode 25, $Rx_4$ follows a similar trend for the horizontal counter electrode line elements $28_2$, but the inverse for the vertical counter electrode line elements $29_2$. Consequently, there is no reason to identify the optimum position for vertical counter electrode line elements $29_2$ when considering all of the sensing electrodes 25, 26. On the other hand, setting the horizontal counter electrode line elements $28_2$ to lie in the middle of the sensing sub-cells 24 (i.e., 50% shifting with respect to FIG. 7) provides a higher self-capacitance $C_S$ for all the sensing electrodes 25, 26.

Figure 14:
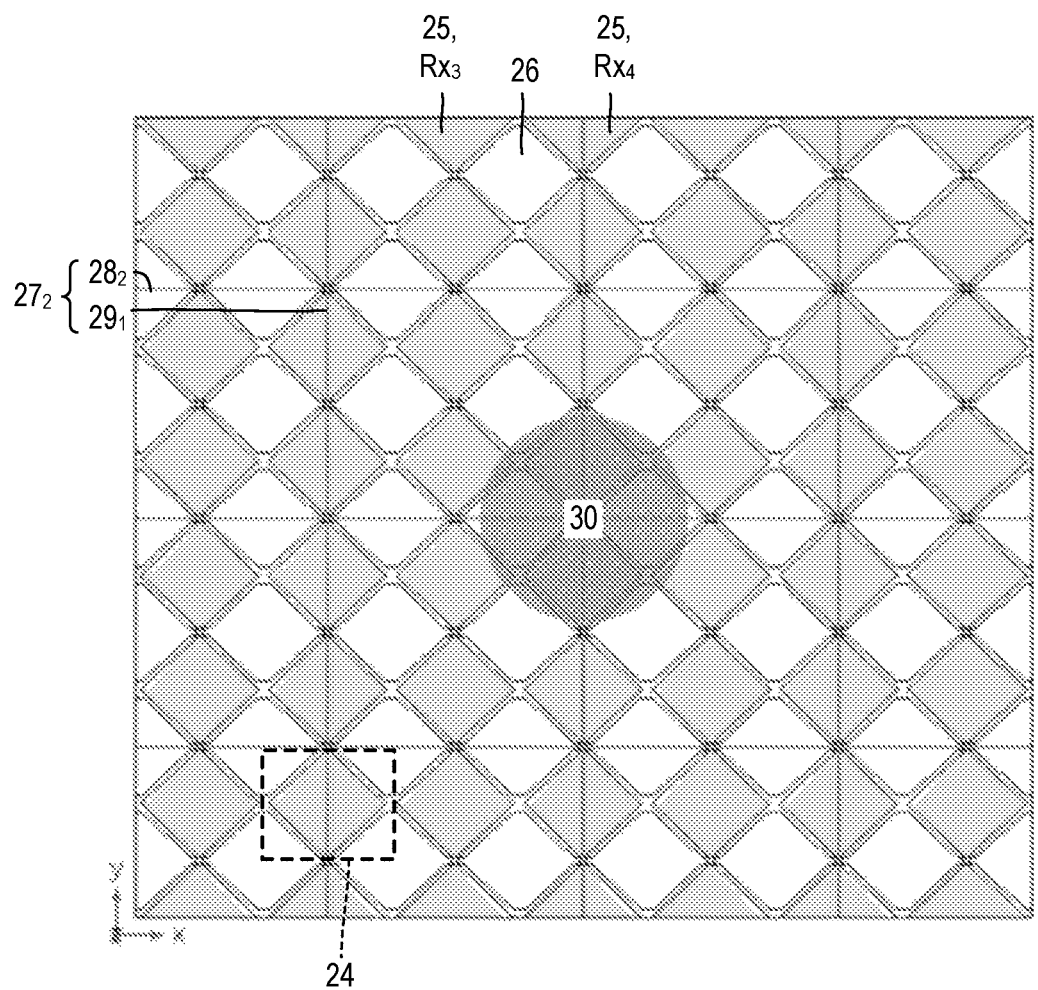
FIG. 14 is a plan view of the second configuration shown in FIG. 7 and a region in which charge may be generated due to a user depressing the sensor.

Referring also to FIG. 14, an area 30 of generated charge, similar to that shown in FIG. 8, is shown for comparison with the second configuration $27_2$.

Figure 15:
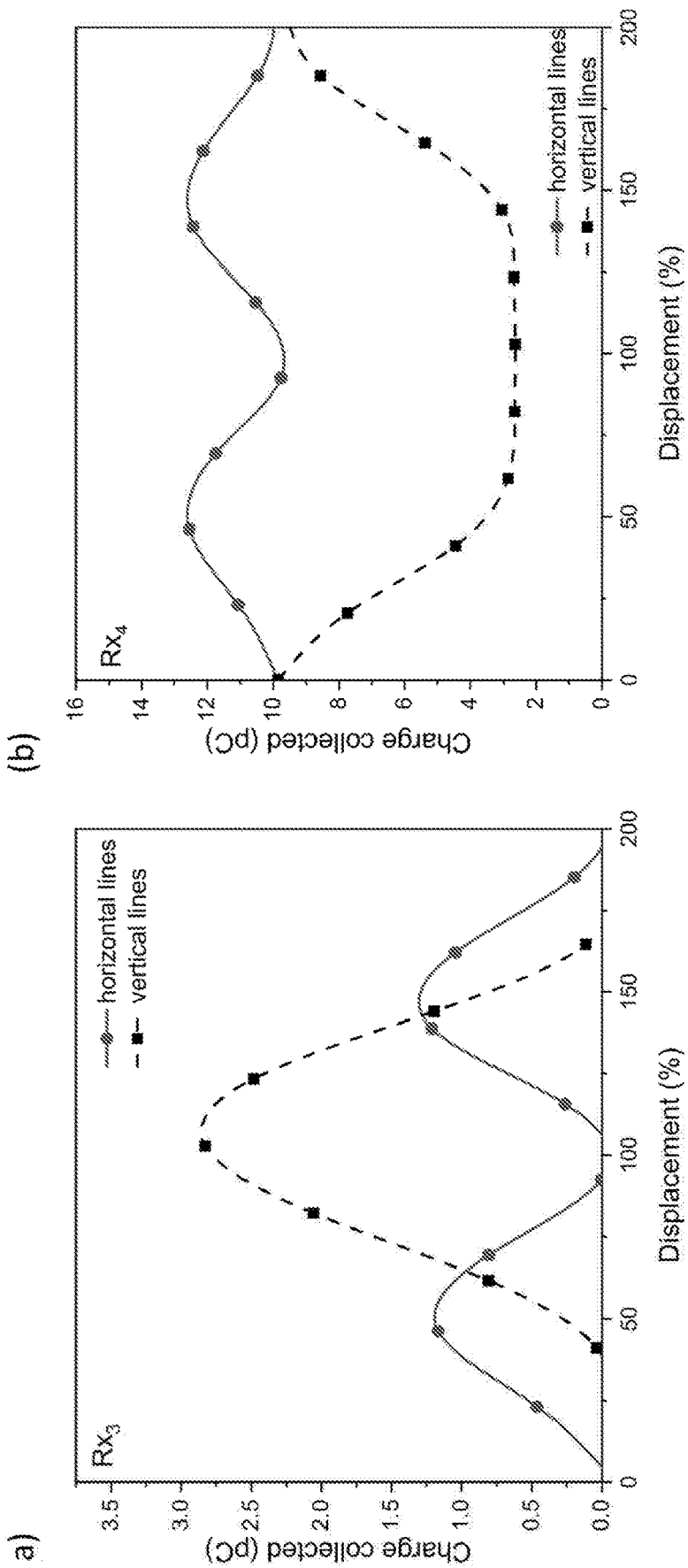
FIG. 15a is a plot of charge collected from a third sensing electrode $Rx_3$ as a function of electrode displacement with respect to horizontal and vertical counter electrode line elements, where 100% displacement corresponds to a shift of one sub-cell.
FIG. 15b is a plot of charge collected from a fourth sensing electrode $Rx_4$ as a function of electrode displacement with respect to horizontal and vertical counter electrode line elements, where 100% displacement corresponds to a shift of one sub-cell.

Referring also to FIGS. 15a and 15b, the effects of shifting the counter electrode 8 line elements $28_2$, $29_2$ on the charge collected by the third and fourth sensing electrodes $Rx_3$, $Rx_4$ are shown.

Figure 13:
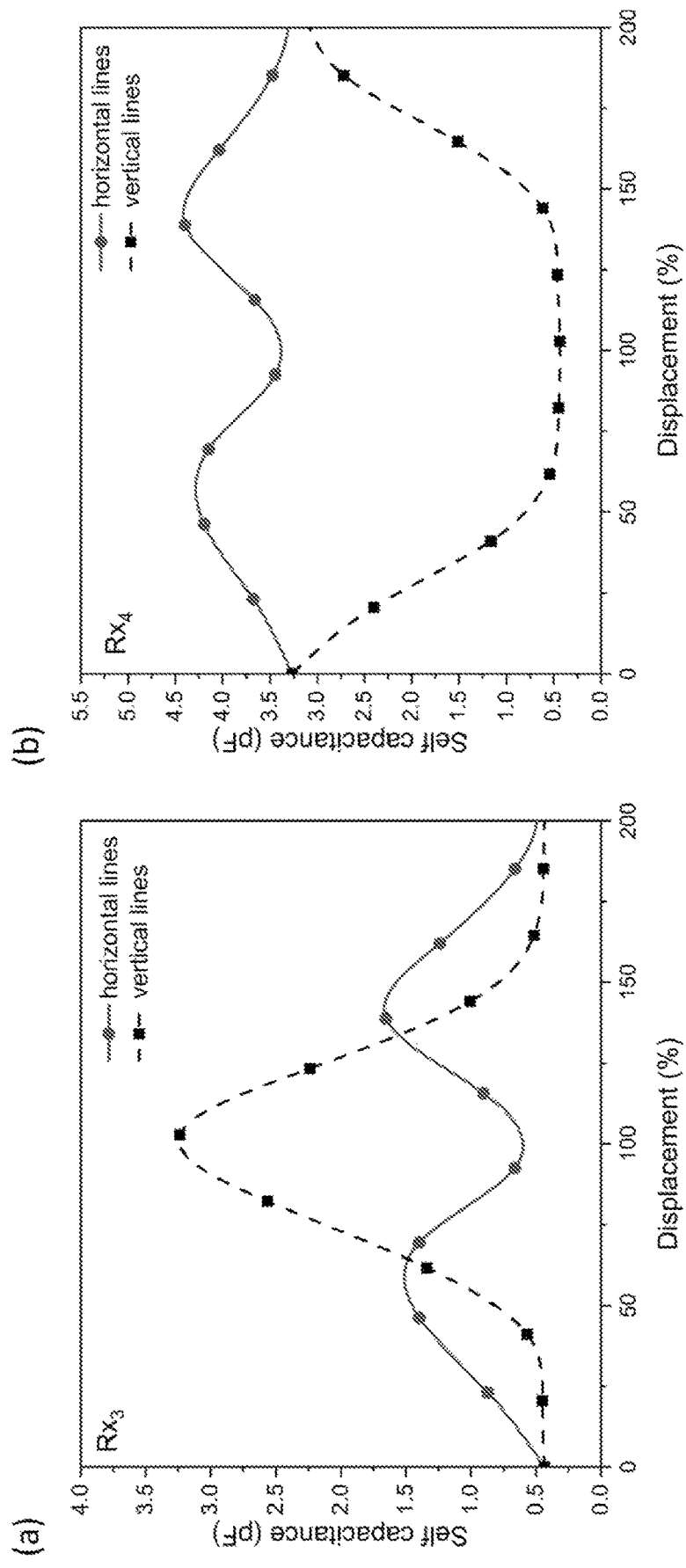
FIG. 13a is a plot of self-capacitance against displacement for a fourth sensing electrode $Rx_4$ with respect to counter electrode line elements for the second configuration shown in FIG. 7, where 100% displacement corresponds to a shift of one sub-cell.
FIG. 13b is a plot of charge collected from a fourth sensing electrode $Rx_4$ as a function of electrode displacement with respect to counter electrode line elements for the second configuration shown in FIG. 7, where 100% displacement corresponds to a shift of one sub-cell.

The behaviours shown in FIGS. 15a and 15b are the same as those shown in FIGS. 13 and 13b. This is not unexpected because the charge collected by a sensing electrode 25 is proportional to its self-capacitance (as Equation (2)), which is further proportional to the overlapping area between the sensing electrode 25 and the counter electrode line elements $28_2$, $29_2$. As explained hereinbefore, choosing the position of the vertical counter electrode line elements $29_2$ will not make a significant difference because it will be effective only every alternating sensing electrode 25. For example, as shown in FIGS. 13a and 13b and in FIGS. 15a and 15b, to maximise charge collection by the fourth electrode $Rx_4$, a vertical counter electrode line element $29_2$ should be positioned in the middle of fourth electrode $Rx_4$ electrode. If the push-touch position is moved on the neighbouring sub-cell 24, i.e. the third sensing electrode $Rx_3$, then the vertical counter electrode line elements $29_2$ should be shifted by 50% to achieve the maximum charge collection. This means that the force-response may be irregular across the active area of the sensor.

To help overcome this irregularity in charge collection, two adjacent sensing electrodes 25 can be combined into one channel to maximize the net uniformity. For example, by connecting adjacent sensing electrodes 25 to the input of a single charge amplifier which is configured to sum the input charges.

Figure 16:
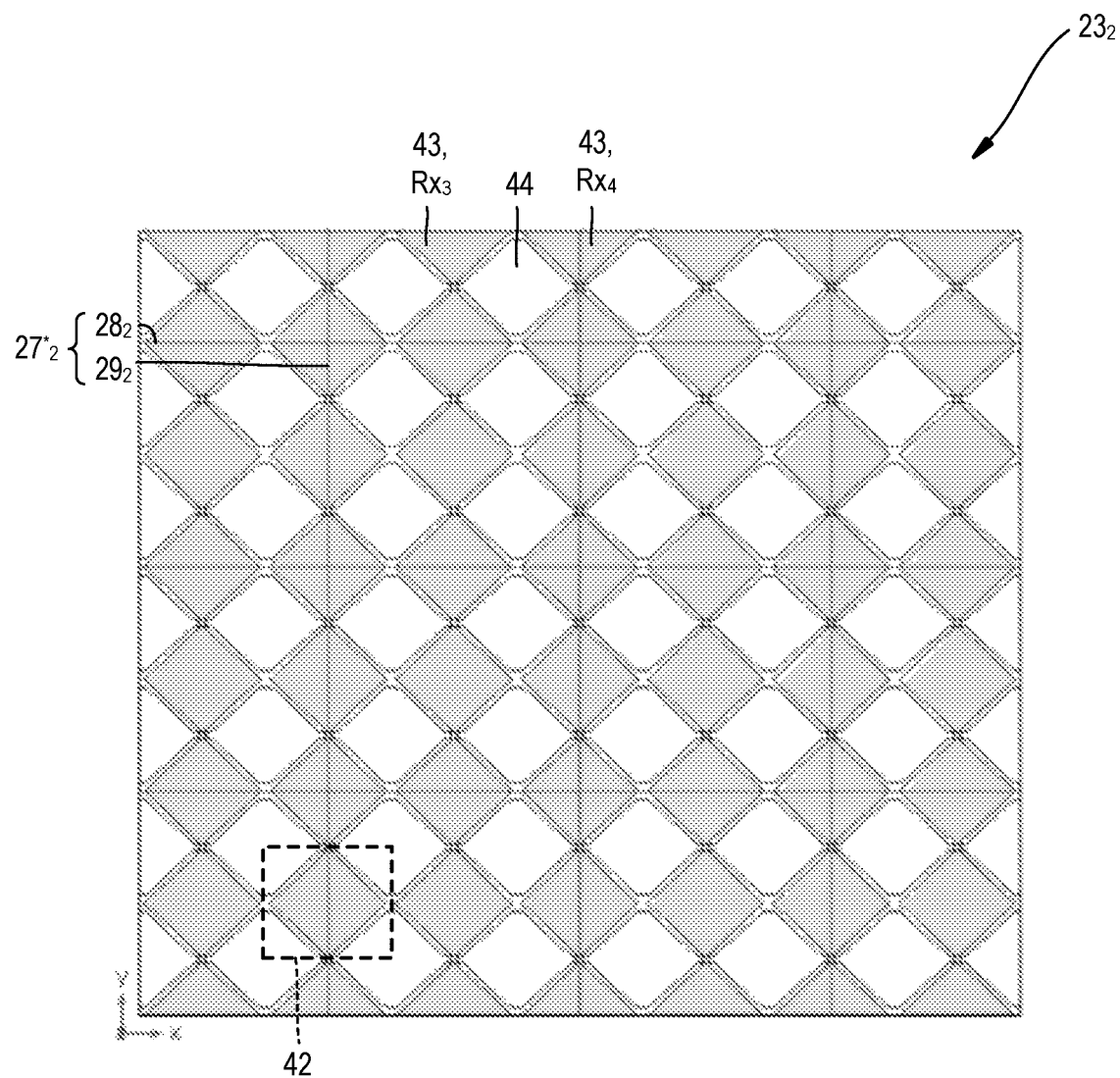
FIG. 16 is a plan view of a preferred second configuration in which the counter electrode elements have lateral displacements which maximise self-capacitance.

Referring also to FIG. 16, an optimised second configuration $27*_2$ is shown. As explained hereinbefore, setting the horizontal counter lines $28_2$ in the middle of the sensing sub-cells (i.e., 50% shifting with respect to FIG. 7) provides a higher charge collection for all the sensing electrodes 25.

This result may be extrapolated to even sparser arrangements of the horizontal and vertical counter electrode line elements 28, 29. If the spacing of the counter electrode line elements 28, 29 is more than one sub-cell 24, then the counter electrode line elements 28, 29 should be arranged to pass at least over the middle of diamond shaped areas of sensing electrodes 25, so as to maximise self-capacitance $C_S$. To overcome any resulting irregularity of the force-response, adjacent sensing electrodes 25 should be combined into single channels. As a general rule, if the spacing of the counter electrode 8 is formed from counter electrode line elements 28, 29 spaced every N sub-cells 24, then N adjacent sensing electrodes 25 should be combined to into a single channel. For example by connecting the N adjacent sensing electrodes 25 to the input of a single charge amplifier configured to sum the input charges.

Demonstration of Force Sensing with On-Cell Architecture

Figure 17:
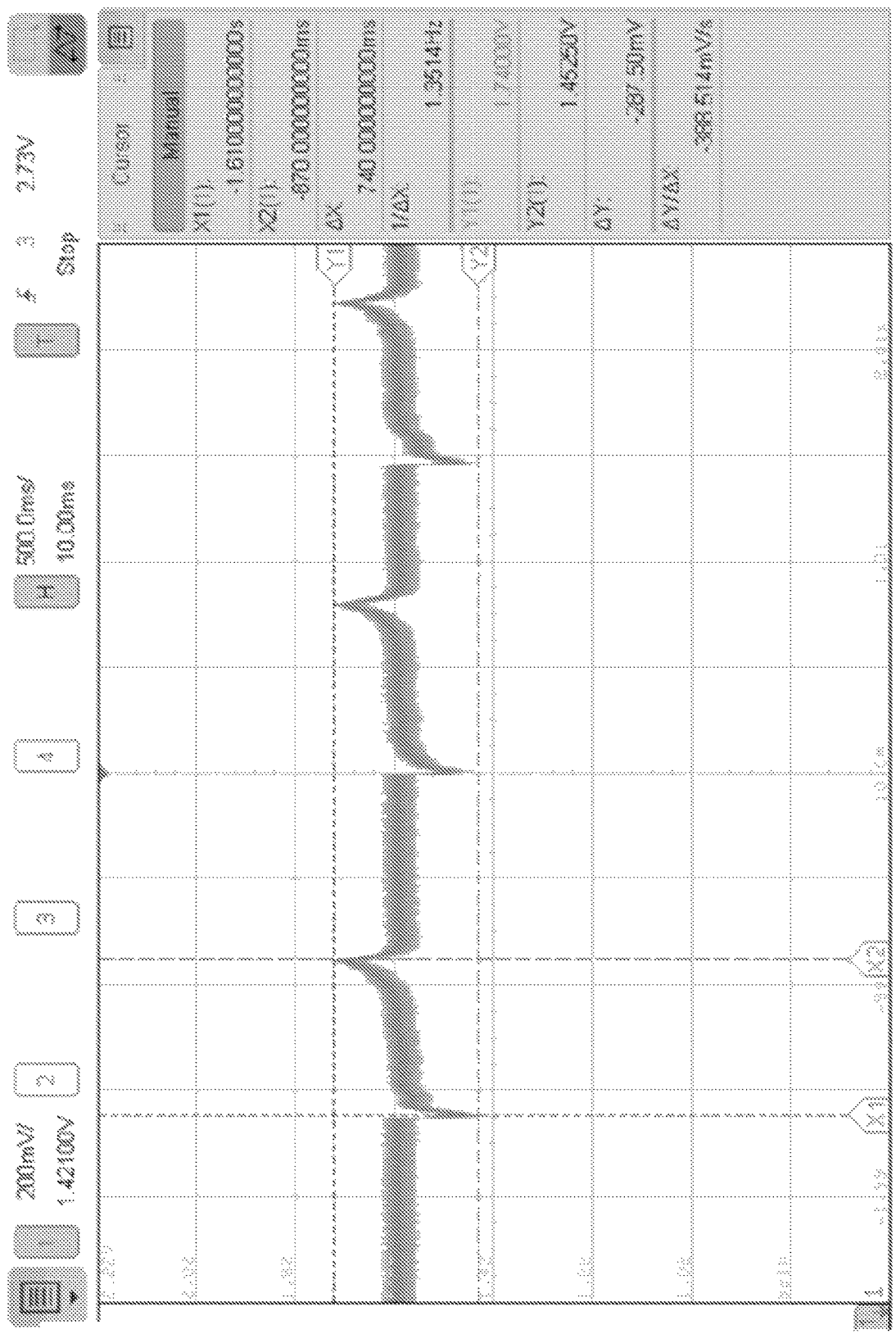
FIG. 17 is a screen shot of an oscilloscope showing charge amplifier output for three taps (i.e., user actuations) for the touch sensor shown in FIG. 1.

Referring also to FIG. 17, a screen shot of a first oscilloscope trace is shown. The trace shows the response of a charge amplifier output in response to three taps (i.e., user actuations) for the touch sensor shown in FIG. 1, i.e., a touch sensor without a counter electrode 8.

Figure 18:
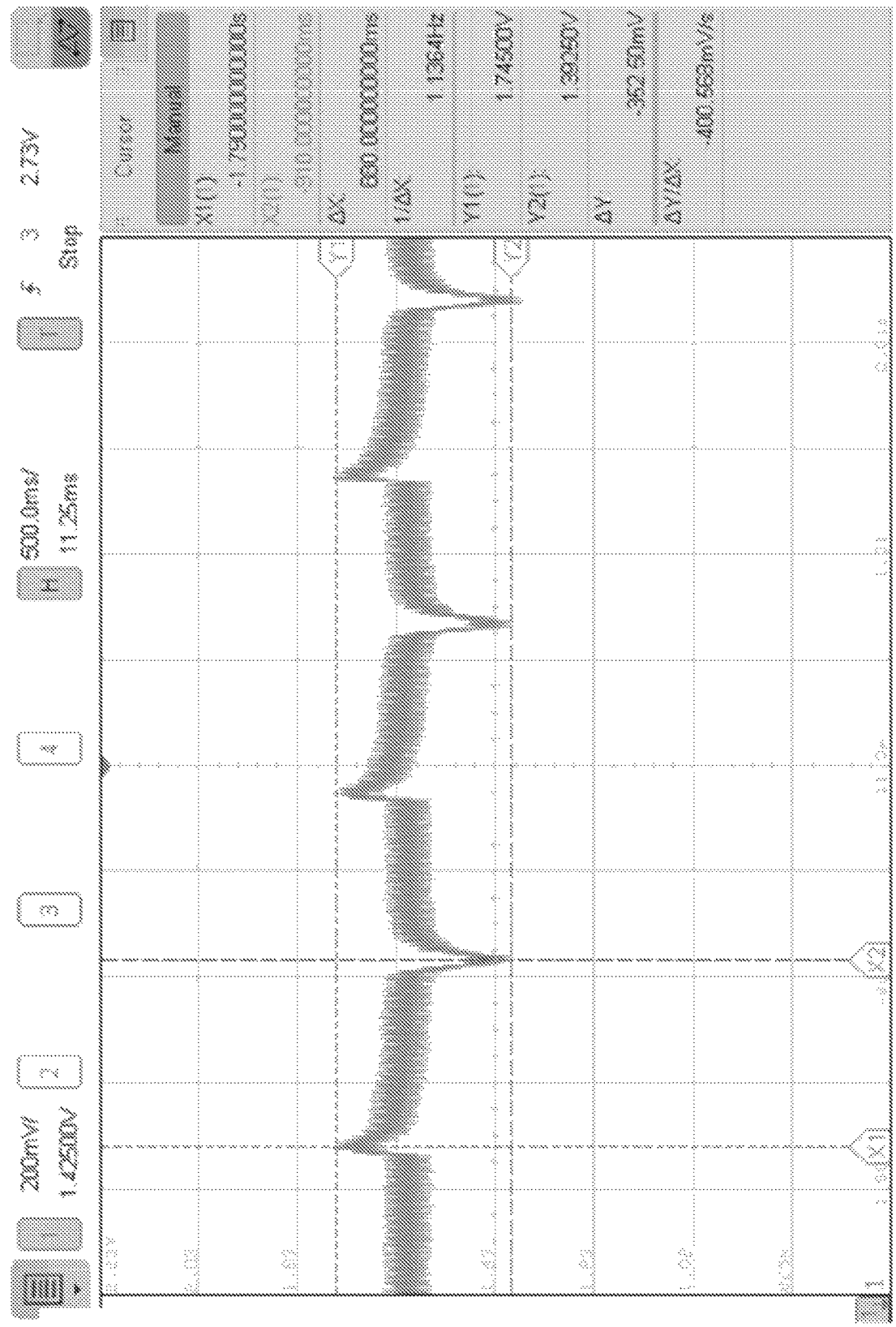
FIG. 18 is a screen shot of an oscilloscope showing charge amplifier output for three taps for the touch sensor shown in FIG. 2.

Referring to FIG. 18, a screen shot of a second oscilloscope trace is shown. The trace shows the response of a charge amplifier output in response to three taps for the touch sensor shown in FIG. 2, i.e., the touch sensor 1 with a counter electrode 8.

In terms of force detection, the output from the charge amplifier indicates the quality of signal obtained. For these measurements, the projective capacitive touch sensing signal was disabled to obtain force signal only.

Both touch sensors produce good-quality signals having respective peak-to-peak voltage of 287.5 mV and 352.5 mV. The magnitude of the signal is greater for the on-cell architecture (FIG. 18) according to the present specification, because the self-capacitance $C_S$ of the force sensing electrode 5 is larger. There is no thick, electrically-insulating layer (such as a layer of PET) only a thin, optically-clear adhesive between the transparent piezoelectric film 3 and the counter electrode 8, and capacitance $C_S$ is inversely proportional to the dielectric thickness.

The signals for the two different sensors have inverted polarities. This is because the transparent piezoelectric film 3 and ground layer configurations for the two sensors are inverted with respect to each other. In other words, in the FIG. 1 sensor, the order is ground, piezoelectric, sensing electrode, whereas in the example of the touch sensor 1 according to the present specification as shown in FIG. 2, the order is second (sensing) electrode, piezoelectric film 3, counter electrode 8. The relative poling direction of the piezoelectric film 3 was the same for both sensors.

Thus, the on-cell architecture provides a good-quality force signal, with piezoelectric layer above the touch sensing electrodes, and the integration of the on-cell architecture into existing touch screen panels becomes feasible.

Applications of On-Cell Architecture

Figure 19:
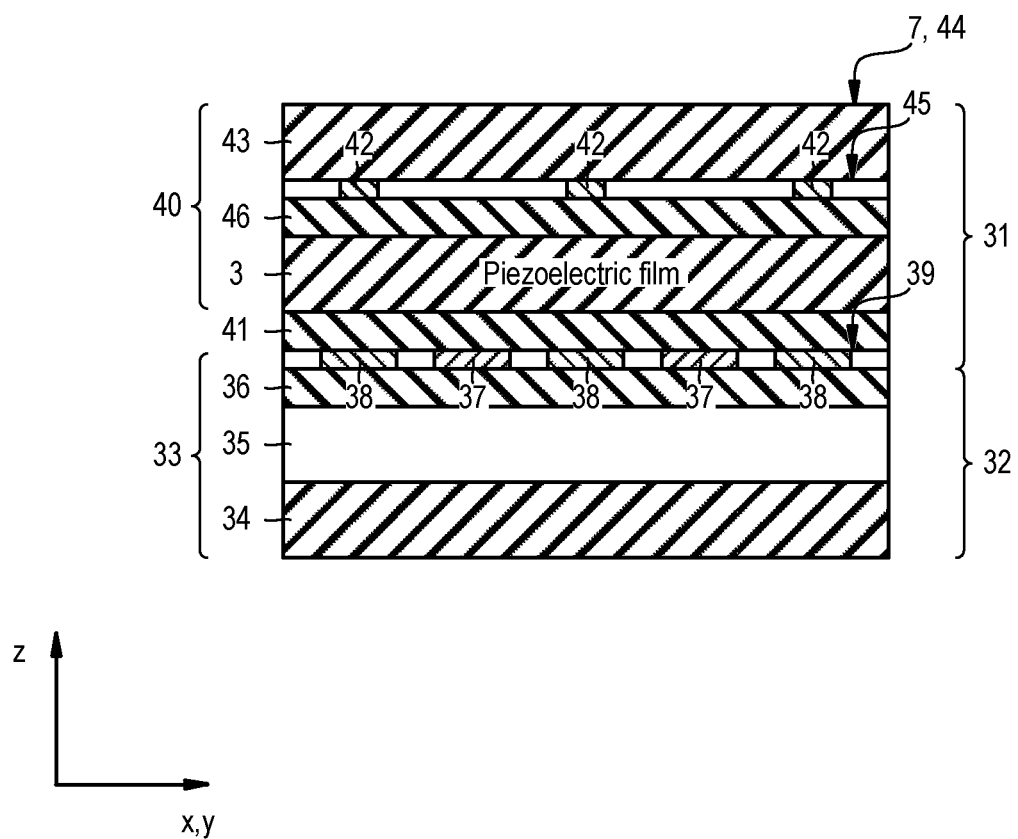
FIG. 19 is a cross-section view of an assembly comprising a touch sensor capable of capacitive touch sensing and a force sensor capable of piezoelectric force detection.

Referring to FIG. 19, an example of a touch sensor 31 for a display 32 is shown. The touch sensor 31 has an on-cell architecture similar to that hereinbefore described.

The touch sensor 31 incorporates a non-force-sensing touch panel 33 comprising a glass substrate 34 (or "TFT glass"), pixel array 35 which may comprise LCD, OLED or other pixel, an encapsulation layer 36 and first and second electrodes 4, 5 in the form of co-planar drive and sensing electrodes 37, 38. The non-force-sensing touch panel 33 has a principal surface 39.

The touch sensor 31 includes a force-sensing layer structure 40 which is glued to the non-force-sensing touch panel 33 using optically-transparent adhesive layer 41.

The force-sensing layer structure 40 comprises a piezoelectric film 3, a transparent counter electrode 8 in the form of a grid-like transparent counter electrode 42, and a transparent cover 6 in the form of cover glass 43 (herein referred to as the "cover glass") having a first (user input) surface 7, 44 and a second, opposite surface 45. The cover glass 43 is bonded to the piezoelectric film 3 by a layer of optically clear adhesive 46.

The on-cell architecture has the piezoelectric layer 3 which is provided on top of the non-force sensing touch panel 33. This provides an on-cell solution which allows the force-sensing layer structure 40 to be added or incorporated into a conventional touch panel.

In a general case, a method of making a display assembly may include receiving a display panel comprising a pixel array 35, a number of first electrodes 4, and a number of second electrodes 5. The second electrodes 5 are insulated from the first electrodes 4, and the first and second electrodes 4, 5 are configured for capacitive touch sensing. For example, the display assembly may take the form of non-force-sensing touch panel 33.

The method of making a display assembly also includes receiving a pressure sensing assembly which includes a transparent cover 6 having a second face 22 supporting a patterned counter electrode 8. The patterned counter electrode 8 takes the form of an interconnected conductive region formed from the union of a plurality of counter electrode elements 9. The pressure sensing assembly also includes a transparent piezoelectric film 3 bonded to the second face 22. For example, the pressure sensing assembly may take the form of force-sensing layer structure 40.

The method of making a display assembly proceeds via a step of bonding the pressure sensing assembly to the display panel such that the piezoelectric film 3 is stacked between the transparent cover 6 and the first and second electrodes 4, 5, and the lateral displacements L of counter electrode elements 9 with respect to the first and second electrodes 4, 5 are configured to maximise a capacitance $C_S$ between the patterned counter electrode 8 and the first electrodes 4, or between the patterned counter electrode 8 and the second electrodes 5. For example, this step corresponds to gluing the force-sensing layer structure 40 to the non-force-sensing touch panel 33 using optically-transparent adhesive layer 41.

Figure 20:
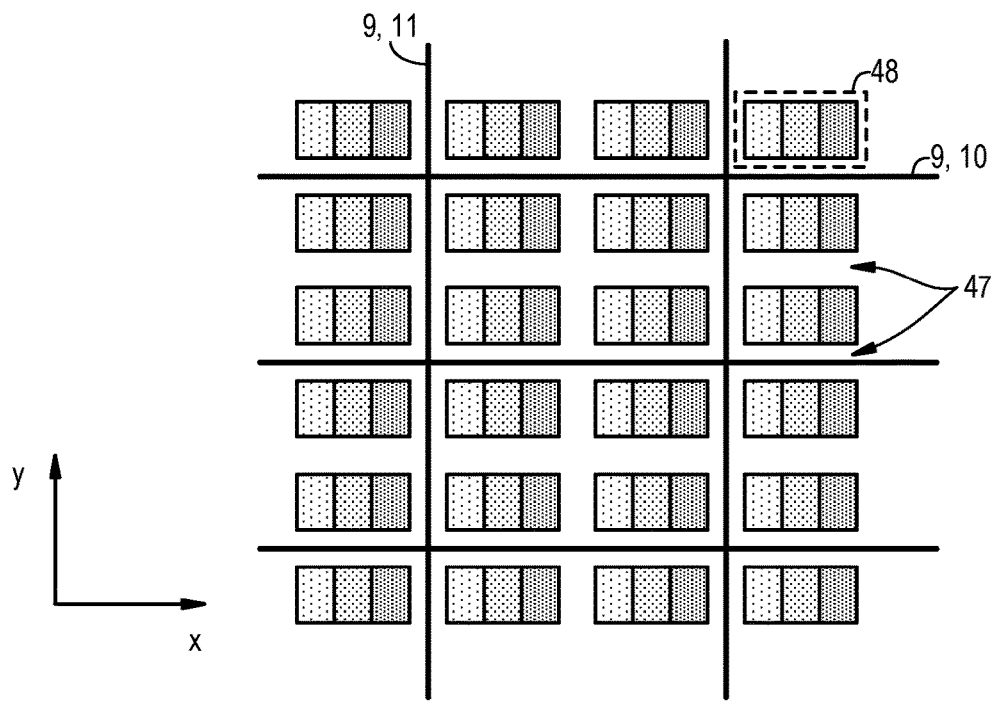
FIG. 20 is a plan view of part of a sensor comprising an array of display panel pixels and non-transparent counter electrode line elements interposed between pixels.

Referring also FIG. 20, counter electrode elements 9, for example counter electrode line elements 10, 11, can be aligned with gaps 47 between display panel pixels 48 of the pixel array 35. Thus, non-transparent materials (such as a metal mesh) can be used for the counter electrode 8 without affecting the display quality.

Counter Electrode Grid Line Width

The width of horizontal and vertical counter electrode line elements 10, 11, 28, 29 forming a counter electrode 8 in the form of a grid or mesh may also be optimised to maximise the capacitance $C_S$ for piezoelectric measurements, without adversely affecting projected capacitance (PCAP) measurement performance.

Further simulations were conducted to determine the effects of varying the width w of the horizontal and vertical counter electrode line elements $28_1$, $29_1$ of the first configuration $27_1$, with the lateral displacements $L_x$, $L_y$ of the horizontal and vertical counter electrode line elements $28_1$, $29_1$ according to the optimised first configuration $27°_1$ (FIG. 10). A range of widths w for the horizontal and vertical counter electrode line elements $28_1$, $29_1$ were simulated, ranging between w=10 µm and w=2 mm. Since the horizontal and vertical counter electrode line elements $28_1$, $29_1$ are spaced every single sub-cell 24, values were again only calculated for the $Rx_4$ sensing electrode 25.

The charge collection through the sensing electrodes 25, $Rx_4$ was also simulated, by adding a circular area 30 of generated charge having a diameter of 8 mm, representative of the single touch/push area of a human finger on the sensor (FIG. 8). The charge density was set to 10 pC·mm$^{-2}$, hence the net charge simulated was 502.65 pC.

Figure 21:
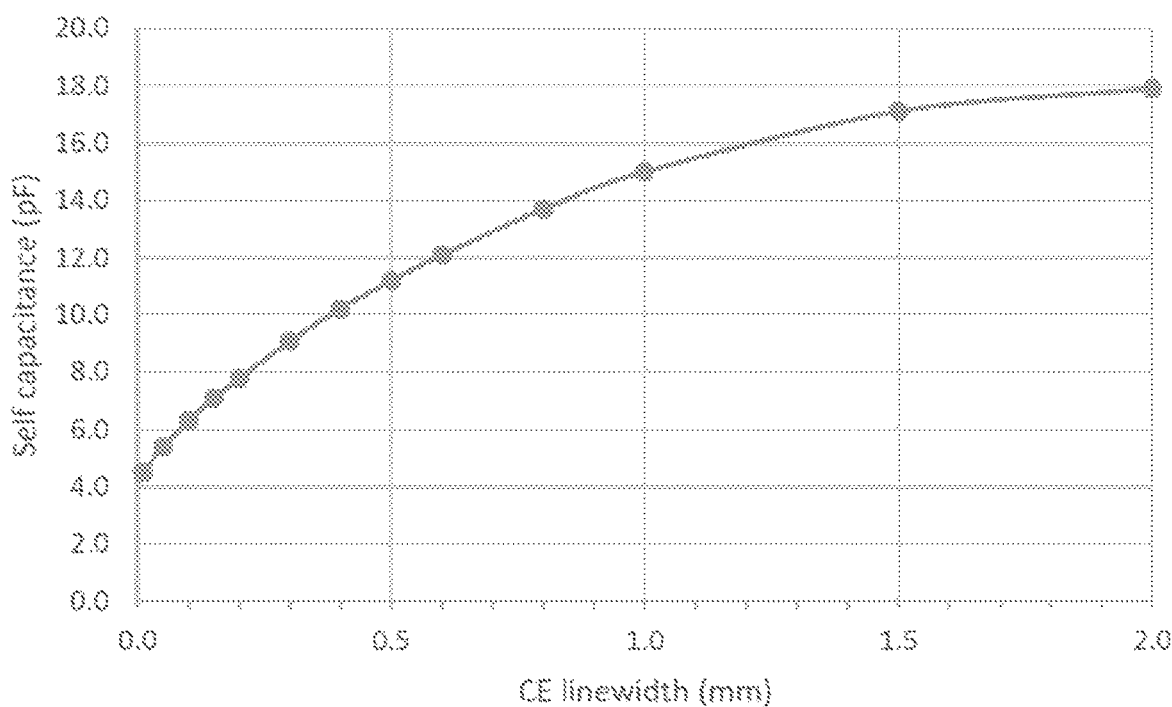
FIG. 21 is a plot of self-capacitance of a fourth sensing electrode $Rx_4$ against the width of horizontal and vertical counter electrode line elements, for the first configuration shown in FIG. 6.

Referring also to FIG. 21, the self-capacitance $C_S$ of the $Rx_4$ sensing electrode 25 is plotted against the width w of the horizontal and vertical counter electrode line elements $28_1$, $29_1$.

It may be observed that by increasing the width w of the horizontal and vertical counter electrode line elements $28_1$, $29_1$, the self-capacitance $C_S$ of the $Rx_4$ sensing electrode 25 also increases. The self-capacitance $C_S$ is observed to follow a saturation trend, which is expected as a consequence of the fixed, finite area of the $Rx_4$ sensing electrode 25.

Figure 22:
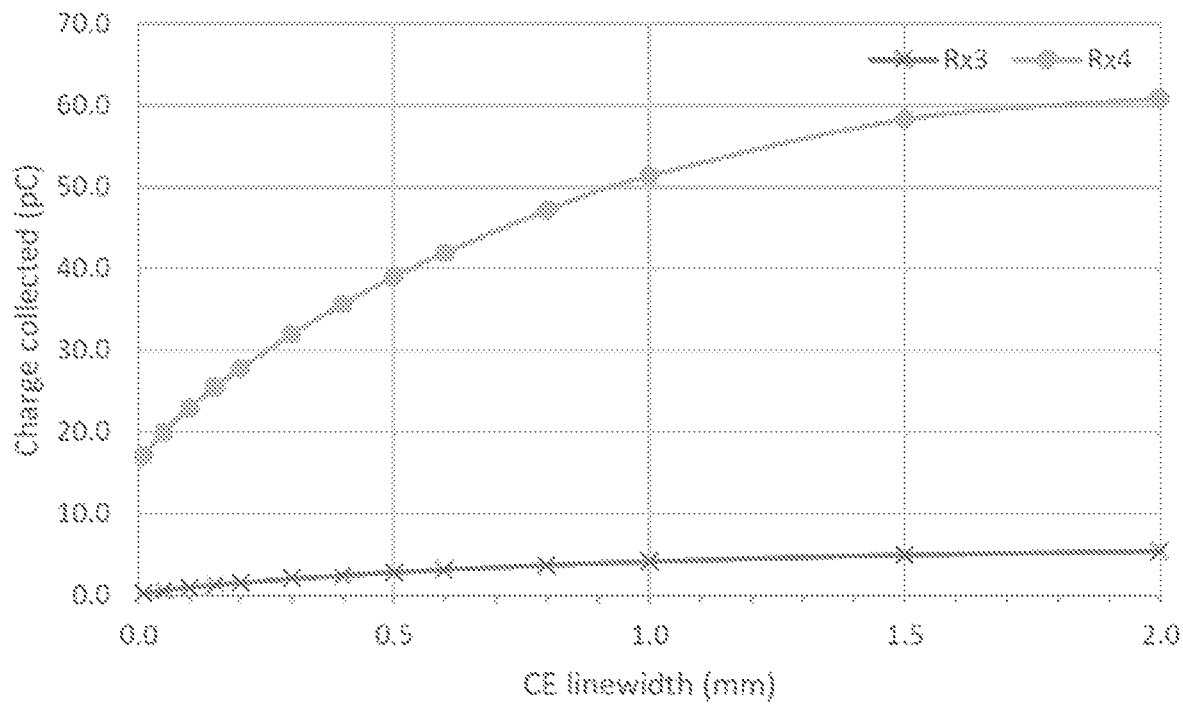
FIG. 22 plots the charge collected by third and fourth sensing electrodes $Rx_3$, $Rx_4$, against the width of horizontal and vertical counter electrode line elements, for the first configuration shown in FIG. 6.

Referring also to FIG. 22, the charge collected by the $Rx_4$ sensing electrode 25 is plotted against the width w of the horizontal and vertical counter electrode line elements $28_1$, $29_1$. The charge collected by the adjacent $Rx_3$ sensing electrode 25 is also plotted.

It may be observed that by increasing the width w of the horizontal and vertical counter electrode line elements $28_1$, $29_1$ also increases the charge collected by the $Rx_4$ sensing electrode 25, as expected. Furthermore, increasing the width w also results in a small increase in the charge collected by the adjacent $Rx_3$ sensing electrode 25.

Increases in the self-capacitance $C_S$ via increasing of the width w of the horizontal and vertical counter electrode line elements $28_1$, $29_1$ must be limited by the need to avoid substantially degrading the PCAP touch sensing, i.e. the mutual capacitance $C_m$ between the sensing and driving electrodes 25, 26.

Figure 23:
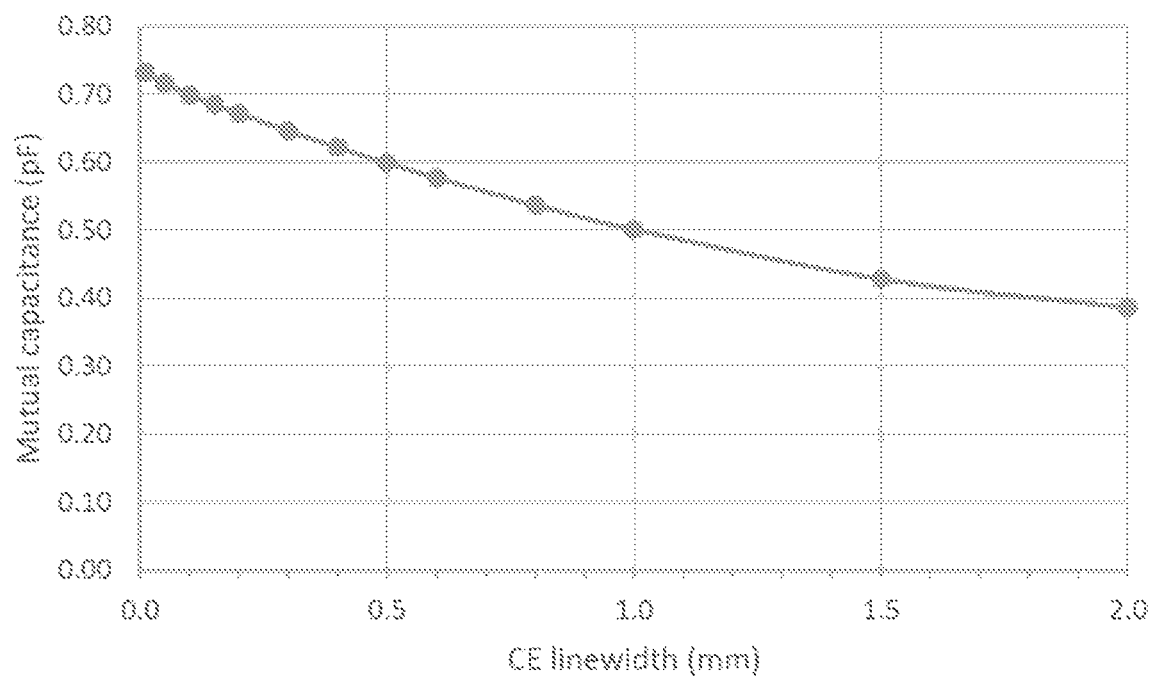
FIG. 23 is a plot of mutual capacitance between a sensing electrode Rx and a drive electrode Tx as a function of the width of horizontal and vertical counter electrode line elements, for the first configuration shown in FIG. 6.
Figure 24:
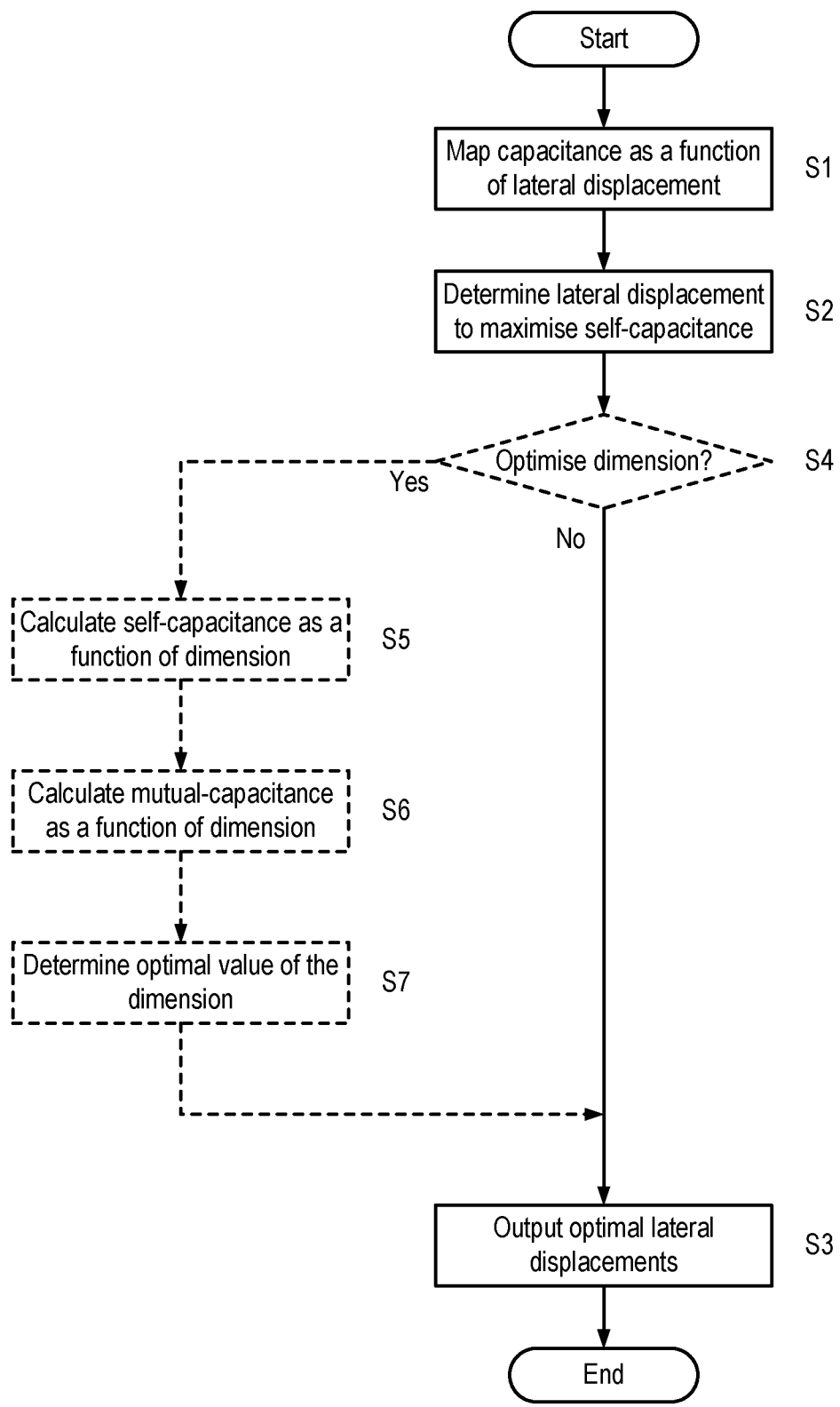
FIG. 24 is a process flow diagram of a method of optimising a touch sensor.

Referring also to FIG. 23, the mutual capacitance $C_m$ between the sensing and driving electrodes 25, 26 is plotted against the width w of the horizontal and vertical counter electrode line elements $28_1$, $29_1$.

It may be observed that as the self-capacitance $C_S$ is enhanced by increasing width v of the horizontal and vertical counter electrode line elements $28_1$, $29_1$, the mutual-capacitance $C_m$ between the sensing and driving electrodes 25, 26 decreases.

Therefore, the width w of the horizontal and vertical counter electrode line elements $28_1$, 29 should be set so that self-capacitance $C_S$ is as large as possible, without dropping below a minimum mutual capacitance $C_m$ necessary for conducting PCAP touch sensing. For example, if PCAP touch-driver has a minimum operating value of $C_m$=0.6 pF, then it may be read out from FIGS. 21 to 23 that the width w of the horizontal and vertical counter electrode lines $28_1$, 29 should not exceed 500 µm. Another way to consider this balance is to note that increasing the width of the counter electrode line elements 28, 29 increases the area of sensing and driving electrodes 25, 26 which are screened from electromagnetic coupling with a user's finger or conductive stylus. The need to make the self-capacitance $C_S$ is as large as possible should be balanced against the need to avoid excessively screening interactions between a user and the sensing and driving electrodes 25, 26. Similar considerations apply more generally to screening of the first and/or second electrodes 4, 5 by counter electrode elements 9 of the patterned counter electrode 8.

The optimum width w for a given touch sensor 1 including counter electrode line elements 10, 11, 28, 29 will depend on a variety of factors, including the shape and size of the electrodes 4, 5 28, 29, the shape of the counter electrode 8, the optimum lateral displacements L, $L_x$, $L_y$, of the counter electrode 8 relative the electrodes 4, 5, 28, 29, and so forth.

Modifications

It will be appreciated that various modifications may be made to the embodiments hereinbefore described. Such modifications may involve equivalent and other features which are already known in the design, manufacture and use of touch panels and component parts thereof and which may be used instead of or in addition to features already described herein. Features of one embodiment may be replaced or supplemented by features of another embodiment.

The example of a counter electrode 8 shown in FIG. 3 takes the form of a grid or mesh, and includes first and second counter electrode line elements 10, 11 oriented perpendicular to one another to form a square grid. However, counter electrode line elements may meet at non-perpendicular angles, and in general a counter electrode 8 in the form of a grid or mesh may be formed from the union of a plurality of first counter electrode line elements 10,11 extending in a first direction and a plurality of second counter electrode line elements 10, 11 extending in a second direction, the second direction not being parallel to the first.

Examples have been presented in which the counter electrode 8 takes the form of a grid or mesh formed from perpendicular sets of counter electrode line elements 10, 11, 28, 29. However, the counter electrode elements 9 forming the counter electrode 8 may have other shapes (whether regular or irregular). The important point is to optimise the lateral displacements L of the counter electrode elements 9 forming the counter electrode 8 with respect to the electrodes 4, 5, so as to maximise the self-capacitance $C_S$ of one or more electrodes 4, 5 used for sensing piezoelectric induced charges. Preferably, the counter electrode elements 9 forming the counter electrode 8 may have the same or similar shape as corresponding electrodes 4, 5. Optionally, the width w, or other characteristic dimension of counter electrode elements 9 forming the counter electrode 8 may also be optimised, so as to determine the maximum width (or other characteristic dimension) which does not impede capacitive sensing using the electrodes 4, 5.

Method of Optimising a Touch Sensor for General Shapes of First and Second Electrodes and Counter Electrode The methods of optimising the touch sensor 1 have been described in the context of first and second electrode 4, 5, for example sensing and driving electrodes 25, 26, having generally diamond shaped electrodes, and counter electrodes 8 formed from the union of counter electrode line elements 10, 11, 28, 29. However, the approaches outlined hereinbefore may be generalised to any geometry of electrodes 4, 5 and counter electrode elements 9. The method is applicable to optimisation of any touch sensor 1 including first electrodes 4, second electrodes 5, a transparent cover 6, a transparent piezoelectric film 3 arranged between the transparent cover 6 and the first and second electrodes 4, 5, and a patterned counter electrode 8 disposed between the transparent piezoelectric film 3 and the transparent cover 6.

The method of optimising a touch sensor 1 having a generic layout includes mapping, for a range of lateral displacements L of counter electrode elements 9 with respect to the first and second electrodes 4, 5, a capacitance $C_S$ between the patterned counter electrode 8 and the first electrodes 4, or a capacitance $C_S$ between the patterned counter electrode 8 and the second electrodes 5 (step S1). The mapping step may be performed by calculating the capacitance $C_S$ between the patterned counter electrode 8 and the first or second electrodes 4, 5 for each combination of lateral displacements L. The mapping step may include using lateral displacements L corresponding to regularly spaced positions, or the mapping step may involve using an iterative search method to determine the optimal lateral displacements L. Alternatively, the mapping may include using lateral displacements L corresponding to regularly spaced positions, followed by an iterative search method using the best of the regularly spaced positions as a starting condition. When the first and/or second electrodes 4, 5 are disposed in a periodic pattern, only one period worth of lateral displacements L may need to be mapped.

Based on the mapping, optionally including an iterative search process for fine tuning, optimal lateral displacements L* may be determined for the counter electrode elements 9 relative to the electrodes 4, 5 (step S2). The optimal lateral displacements L* are those which maximise the capacitance $C_S$ between the patterned counter electrode 8 and the first electrodes 4, or between the patterned counter electrode 8 and the second electrodes 5. Once determined, the optimal lateral displacements L* are output (step S3).

The optimal lateral displacements L* may then be employed in order to make a touch sensor 1 using the optimal lateral displacements L*.

In the general case, the counter electrode elements 9 need not be counter electrode line elements 10, 11, 28, 29, and may have other geometries such as, for example, similar diamond patterns to the electrodes 4, 5, 25, 26. If the electrodes 4, 5, 25, 26 are not diamond patterned, for example if the electrodes 4, 5, 25, 26 take the form of z-shaped, H-shaped, or any other geometry known for capacitive sensing, then the counter electrode elements 9 may be conformal with one or both sets of electrodes 4, 5, 25, 26. In such cases, instead of a counter electrode line element width w, any other suitable characteristic dimension of each of the counter electrode elements 9 may configured to have an optimum value such that the capacitance between the patterned counter electrode 8 and the first or second electrodes 4, 5, 25, 26 is maximised, subject to maintaining a mutual capacitance $C_m$ between each pair of first and second electrodes 4, 5 (e.g. sensing and driving electrodes 25, 26) above a minimum operating value (i.e an operating threshold). The width w of a counter electrode line element 10, 11, 28, 29 is simply one example of such a characteristic dimension.

In practice, maintaining a mutual capacitance $C_m$ between each pair of first and second electrodes 4, 5 above the operating threshold corresponds to ensuring that an electric field generated between the first and second electrodes 4, 5 projects sufficiently above the touch sensor 1, i.e. above input surface 7, to enable coupling to a sensed object, for example a user's digit or conductive stylus.

The method of optimising a touch sensor 1 may be extended to include optimisation of a characteristic dimension of the counter electrode elements 9 (step S4). For example, the method of optimising a touch sensor 1 may include calculating, using the optimal lateral displacements L*, the capacitance $C_S$ between the patterned counter electrode 8 and the first electrodes 4 as a function of a characteristic dimension of the counter electrode elements 9, or calculating, using the optimal lateral displacements L*, the capacitance $C_S$ between the patterned counter electrode 8 and the second electrodes 5 as a function of a characteristic dimension of the counter electrode elements 9 (step S5). The method of optimising a touch sensor 1 may also include calculating, using the optimal lateral displacements L*, the mutual capacitances $C_m$ between each pair of first and second electrodes 4, 5 as a function of the characteristic dimension of the counter electrode elements 9 (step S6).

Subsequent to calculating self and mutual capacitances $C_S$, $C_m$ as functions of the characteristic dimension, the method of optimising a touch sensor 1 may include determining the optimal value of the characteristic dimension which maximises the value of the capacitance $C_S$ between the patterned counter electrode 8 and the first or second electrodes 4, 5, subject to maintaining the mutual capacitances $C_m$ between each pair of first and second electrodes 4, 5 above an operating threshold $C_{thresh}$ (step S7) When the first and/or second electrodes 4, 5 are disposed in a periodic pattern, only one period worth of first and second electrode 4, pairs may need to be considered. The step of outputting the optimal lateral displacements may additionally include outputting the optimal value of the characteristic dimension (step S3).

The optimal lateral displacements L* and the optimal value of the characteristic dimension may then be employed in order to make a touch sensor 1 using the optimal lateral displacements.

Uncorrelated Sparse Counter-Electrodes

The hereinbefore described second configuration $27_2$ relates to a counter electrode 8 which is relatively sparse in relation to the first and second electrodes 4, 5. The second configuration $27_2$ remains correlated with respect to the counter electrode elements 9 forming the counter electrode 8. However, whilst correlation with the first and second electrodes 4, 5 is preferable for optimal performance, it is possible to use a sparse electrode uncorrelated to the first and/or second electrodes 4, 5. For example, a counter electrode 8 may take the form of a grid or mesh having a pitch $p_c$ between counter electrode line elements 10, 11 which is not selected based on the pitch $p_c$ of the first and second electrodes 4, 5. Additionally or alternatively, the counter electrode 8 may be disposed without controlling the lateral displacements L relative to the first and/or second electrodes 4, 5.

In general, counter electrode line elements 10, 11 may be considered to be correlated with the first electrodes 4 and/or second electrodes 5 if at least some of the counter electrode line elements 10, 11 have been aligned with respect to first and/or second electrodes 4, 5. By contrast, counter electrode line elements 10, 11 may be considered to be uncorrelated with the first electrodes 4 and/or second electrodes 6 if none of the counter electrode line elements 10, 11 have been aligned with respect to the first or second electrodes 10, 11. In other words, "uncorrelated" corresponds to positioning a relatively sparse counter electrode 8 to generally overlie the first and second electrodes 4, 5, without regard to the precise locations of first and second electrodes 4, 5.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A touch sensor for combined capacitive touch and force sensing, the touch sensor comprising:
    a plurality of first electrodes and a plurality of second electrodes, the plurality of second electrodes insulated from the plurality of first electrodes, wherein the plurality of first and second electrodes are configured for mutual capacitive touch sensing;
    a transparent cover;
    a transparent piezoelectric film stacked between the transparent cover and the plurality of first and second electrodes; and
    a patterned counter electrode stacked between the transparent piezoelectric film and the transparent cover, wherein the patterned counter electrode is an interconnected conductive region formed from union of a plurality of counter electrode elements and the plurality of counter electrode elements are disposed having lateral displacements with respect to the plurality of first and second electrodes;
    wherein the lateral displacements of the plurality of counter electrode elements with respect to the plurality of first and second electrodes are configured to maximise a capacitance between the patterned counter electrode and the plurality of first electrodes, or between the patterned counter electrode and the plurality of second electrodes; and
    wherein the patterned counter electrode comprises a grid formed from union of a plurality of first counter electrode line elements extending in a first direction and a plurality of second counter electrode line elements extending in a second direction.

2. The touch sensor according to claim 1, wherein the patterned counter electrode comprises a counter electrode element corresponding to each first electrode of the plurality of first electrodes.

3. The touch sensor according to claim 2, wherein the patterned counter electrode comprises a counter electrode element corresponding to each second electrode of the plurality of second electrodes.

4. The touch sensor according to claim 2, wherein the patterned counter electrode comprises a counter electrode element corresponding to every $M^{th}$ second electrode of the plurality of second electrodes, wherein M is an integer greater than or equal to two.

5. The touch sensor according to claim 1, wherein the patterned counter electrode comprises a counter electrode element corresponding to every $N^{th}$ first electrode of the plurality of first electrodes, wherein N is an integer greater than or equal to two.

6. The touch sensor according to claim 5, wherein the patterned counter electrode comprises a counter electrode element corresponding to each second electrode of the plurality of second electrodes.

7. The touch sensor according to claim 5, wherein the patterned counter electrode comprises a counter electrode element corresponding to every $M^{th}$ second electrode of the plurality of second electrodes, wherein M is an integer greater than or equal to two.

8. A display assembly comprising:
    the touch sensor according to claim 7, and
    a display comprising a pixel array;
    wherein each of the plurality of counter electrode elements is positioned to overlie a gap between pixels forming the pixel array.

9. A display assembly comprising:
    the touch sensor according to claim 5, and
    a display comprising a pixel array;
    wherein each of the plurality of counter electrode elements is positioned to overlie a gap between pixels forming the pixel array.

10. The touch sensor according to claim 1, wherein the patterned counter electrode comprises a counter electrode element corresponding to each second electrode of the plurality of second electrodes.

11. The touch sensor according to 1, wherein the patterned counter electrode comprises a counter electrode element corresponding to every $M^{th}$ second electrode of the plurality of second electrodes, wherein M is an integer greater than or equal to two.

12. A display assembly comprising:
   the touch sensor according to claim 11, and
   a display comprising a pixel array;
   wherein each of the plurality of counter electrode elements is positioned to overlie a gap between pixels forming the pixel array.

13. The touch sensor according to claim 1, wherein the patterned counter electrode is formed on a first surface of the transparent cover, and wherein the first surface faces the transparent piezoelectric film.

14. The touch sensor according to claim 1, wherein a characteristic dimension of each of the plurality of counter electrode elements is configured such that the capacitance between the patterned counter electrode and the plurality of first electrodes is maximised subject to maintaining a mutual capacitance between each pair of first and second electrodes of the plurality of first and second electrodes above an operating threshold.

15. A display assembly comprising:
   The touch sensor according to claim 1, and
   a display comprising a pixel array;
   wherein each of the plurality of counter electrode elements is positioned to overlie a gap between pixels forming the pixel array.

16. A method of making a display assembly, comprising:
   receiving a display panel comprising a pixel array, a plurality of first electrodes, and a plurality of second electrodes, the plurality of second electrodes insulated from the plurality of first electrodes, wherein the plurality of first and second electrodes are configured for capacitive touch sensing;
   receiving a pressure sensing assembly comprising a transparent cover having a first face supporting a patterned counter electrode in a form of an interconnected conductive region formed from union of a plurality of counter electrode elements, and a transparent piezoelectric film bonded to the first face;
   bonding the pressure sensing assembly to the display panel such that:
      the piezoelectric film is stacked between the transparent cover and the plurality of first and second electrodes, and
      lateral displacements of the plurality of counter electrode elements with respect to the plurality of first and second electrodes are configured to maximise a capacitance between the patterned counter electrode and the plurality of first electrodes, or between the patterned counter electrode and the plurality of second electrodes;
   wherein the patterned counter electrode comprises a grid formed from union of a plurality of first counter electrode line elements extending in a first direction and a plurality of second counter electrode line elements extending in a second direction.

17. A touch sensor for combined capacitive touch and force sensing, the touch sensor comprising:
   a plurality of first electrodes and a plurality of second electrodes, the plurality of second electrodes insulated from the plurality of first electrodes, wherein the plurality of first and second electrodes are configured for mutual capacitive touch sensing;
   a transparent cover;
   a transparent piezoelectric film stacked between the transparent cover and the plurality of first and second electrodes; and
   a patterned counter electrode stacked between the transparent piezoelectric film and the transparent cover, wherein the patterned counter electrode is an interconnected conductive region formed from union of a plurality of counter electrode elements and the plurality of counter electrode elements are disposed having lateral displacements with respect to the plurality of first and second electrodes;
   wherein the lateral displacements of the plurality of counter electrode elements with respect to the plurality of first and second electrodes are configured to maximise a capacitance between the patterned counter electrode and the plurality of first electrodes; and, wherein the patterned counter electrode comprises a grid formed from union of a plurality of first counter electrode line elements extending in a first direction and a plurality of second counter electrode line elements extending in a second direction.

18. The touch sensor according to claim 17, wherein the patterned counter electrode comprises a counter electrode element corresponding to each first electrode of the plurality of first electrodes.

19. The touch sensor according to claim 17, wherein the patterned counter electrode comprises a counter electrode element corresponding to every $N^{th}$ first electrode of the plurality of first electrodes, wherein N is an integer greater than or equal to two.

20. The touch sensor according to claim 17, wherein the patterned counter electrode is formed on a first surface of the transparent cover, and wherein the first surface faces the transparent piezoelectric film.

* * * * *